(12) United States Patent
Walters et al.

(10) Patent No.: US 12,423,122 B2
(45) Date of Patent: Sep. 23, 2025

(54) GRAPHICAL USER INTERFACE, METHOD, PROGRAM AND APPARATUS

(71) Applicant: Xero Limited, Wellington (NZ)

(72) Inventors: George Walters, Wellington (NZ); David Mcgahan, Wellington (NZ); Frank Congson, Wellington (NZ)

(*) Notice: Subject to any disclaimer, the term of this patent is extended or adjusted under 35 U.S.C. 154(b) by 0 days.

(21) Appl. No.: 18/813,646

(22) Filed: Aug. 23, 2024

(65) Prior Publication Data
US 2024/0411571 A1  Dec. 12, 2024

Related U.S. Application Data

(63) Continuation of application No. PCT/NZ2023/050017, filed on Feb. 17, 2023.

(30) Foreign Application Priority Data

Feb. 24, 2022 (AU) ................................ 2022900432

(51) Int. Cl.
| | |
|---|---|
| *G06F 3/048* | (2013.01) |
| *G06F 3/04817* | (2022.01) |
| *G06F 3/0482* | (2013.01) |
| *G06F 9/451* | (2018.01) |
| *G06F 40/169* | (2020.01) |

(52) U.S. Cl.
CPC .......... *G06F 9/451* (2018.02); *G06F 3/04817* (2013.01); *G06F 3/0482* (2013.01); *G06F 40/169* (2020.01)

(58) Field of Classification Search
None
See application file for complete search history.

(56) References Cited

U.S. PATENT DOCUMENTS

| | | | |
|---|---|---|---|
| 8,490,026 B2* | 7/2013 | Sareen | G06F 3/04817 715/861 |
| 2009/0013270 A1* | 1/2009 | Helfman | G06F 3/0481 715/764 |
| 2009/0144313 A1* | 6/2009 | Hodge | G06F 40/169 707/999.102 |
| 2014/0108902 A1* | 4/2014 | Brissette | G06F 40/18 715/206 |
| 2017/0329984 A1 | 11/2017 | Clough et al. | |
| 2018/0067976 A1 | 3/2018 | Schoppe et al. | |
| 2019/0179810 A1 | 6/2019 | Miller et al. | |
| 2020/0294640 A1* | 9/2020 | Ginsburg | G16H 40/20 |

* cited by examiner

*Primary Examiner* — Thanh T Vu
(74) *Attorney, Agent, or Firm* — Young Basile Hanlon & MacFarlane, P.C.

(57) ABSTRACT

A GUI for displaying tabular data, each row being divided into cells; the GUI including a frame within which cells are displayed; in a first display state a selected cell comprises a selectable element within the cell, the selectable element being highlighted according to input from a user input mechanism, the GUI executes an action in response to a trigger input from the user input mechanism while highlighted; and in a second display state, the selectable element is not visible.

13 Claims, 20 Drawing Sheets

Profit and Loss

Demo Company (NZ)
For the year ended 15 March 2021
Accrual Basis

— 121a
— 121b
— 121c
— 122
— 112

| | 2021 | 2021 % of Trading Income | Total | Year to date |
|---|---|---|---|---|
| Trading Income | | | | |
| 200 - Sales | 2,608.68 | 100.00% | 2,608.68 | 2,608.68 |
| Total Trading Income | 2,608.68 | 100.00% | 2,608.68 | 2,608.68 |
| Gross Profit | 2,608.68 | 100.00% | 2,608.68 | 2,608.68 |
| Operating Expenses | | | | |
| 445 - Light, Power, Heating | 403.04 | 15.45% | 403.04 | 403.04 |
| Total Operating Expenses | 403.04 | 15.45% | 403.04 | 403.04 |

FIGURE 3a

Profit and Loss

Demo Company (NZ)
For the year ended 15 March 2021
Accrual Basis

— 111a
— 111b
— 111c

| | 2021 | 2021 % of Trading Income | Total | Year to date |
|---|---|---|---|---|
| Trading Income | | | | |
| 200 - Sales | 2,608.68 | 100.00% | 2,608.68 | 2,608.68 |
| Total Trading Income | 2,608.68 | 100.00% | 2,608.68 | 2,608.68 |
| Gross Profit | 2,608.68 | 100.00% | 2,608.68 | 2,608.68 |
| Operating Expenses | | | | |
| 445 - Light, Power, Heating | 403.04 | 15.45% | 403.04 | 403.04 |
| Total Operating Expenses | 403.04 | 15.45% | 403.04 | 403.04 |
| Net Profit | 2,205.64 | 84.55% | 2,205.64 | 2,205.64 |

FIGURE 3b

Profit and Loss

Demo Company (NZ)
For the year ended 15 March 2021
Accrual Basis

121a

| | 2021 | 2021 % of Trading Income | Total | Year to date |
|---|---|---|---|---|
| Trading Income | | | | |
| 200 - Sales | 2,608.68 | 100.00% | 2,608.68 | 2,608.68 |
| Total Trading Income | 2,608.68 | 100.00% | 2,608.68 | 2,608.68 |
| Gross Profit | 2,608.68 | 100.00% | 2,608.68 | 2,608.68 |
| Operating Expenses | | | | |
| 445 - Light, Power, Heating | 403.04 | 15.45% | 403.04 | 403.04 |
| Total Operating Expenses | 403.04 | 15.45% | 403.04 | 403.04 |
| Net Profit | 2,205.64 | 84.55% | 2,205.64 | 2,205.64 |

Profit and Loss

Demo Company (NZ)
For the year ended 15 March 2021
Accrual Basis

121b

| | 2021 | 2021 % of Trading Income | Total | Year to date |
|---|---|---|---|---|
| Trading Income | | | | |
| 200 - Sales | 2,608.68 | 100.00% | 2,608.68 | 2,608.68 |
| Total Trading Income | 2,608.68 | 100.00% | 2,608.68 | 2,608.68 |
| Gross Profit | 2,608.68 | 100.00% | 2,608.68 | 2,608.68 |
| Operating Expenses | | | | |
| 445 - Light, Power, Heating | 403.04 | 15.45% | 403.04 | 403.04 |
| Total Operating Expenses | 403.04 | 15.45% | 403.04 | 403.04 |
| Net Profit | 2,205.64 | 84.59% | 2,205.64 | 2,205.64 |

Profit and Loss

Demo Company (NZ)
For the year ended 15 March 2021
Accrual Basis

111a — 111c — 111b

|  | 2021 | 2021 % of Trading Income | Total | Year to date |
|---|---|---|---|---|
| Trading Income | | | | |
| 200 - Sales | 2,608.68 | 100.00% | 2,608.68 | 2,608.68 |
| Total Trading Income | 2,608.68 | 100.00% | 2,608.68 | 2,608.68 |
| Gross Profit | 2,608.68 | 100.00% | 2,608.68 | 2,608.68 |
| Operating Expenses | | | | |
| 445 - Light, Power, Heating | 403.04 | 15.45% | 403.04 | 403.04 |
| Total Operating Expenses | 403.04 | 15.45% | 403.04 | 403.04 |
| Net Profit | 2,205.64 | 84.55% | 2,205.64 | 2,205.64 |

FIGURE 3k

Profit and Loss

Demo Company (NZ)
For the year ended 15 March 2021
Accrual Basis

— 111b

|  | 2021 | 2021 % of Trading Income | Total | Year to date |
|---|---|---|---|---|
| Trading Income | | | | |
| 200 - Sales | 2,608.68 | 100.00% | 2,608.68 | 2,608.68 |
| Total Trading Income | 2,608.68 | 100.00% | 2,608.68 | 2,608.68 |
| Gross Profit | 2,608.68 | 100.00% | 2,608.68 | 2,608.68 |
| Operating Expenses | | | | |
| 445 - Light, Power, Heating | 403.04 | 15.45% | 403.04 | 403.04 |
| Total Operating Expenses | 403.04 | 15.45% | 403.04 | 403.04 |
| Net Profit | 2,205.64 | 84.55% | 2,205.64 | 2,205.64 |

FIGURE 3l

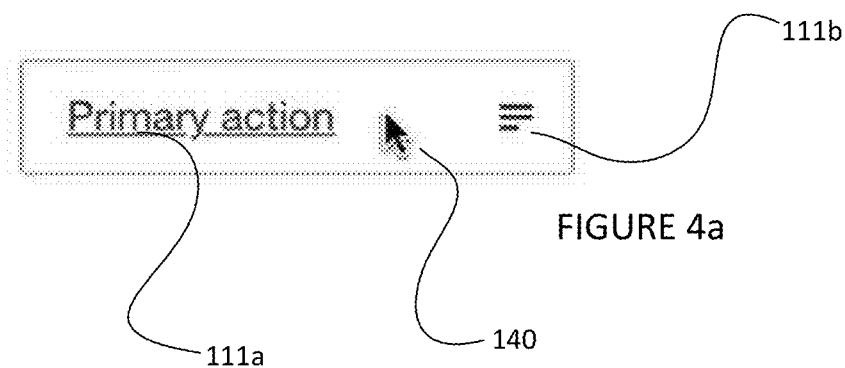
FIGURE 4a
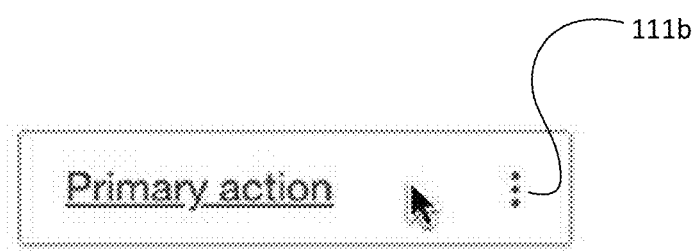
FIGURE 4b
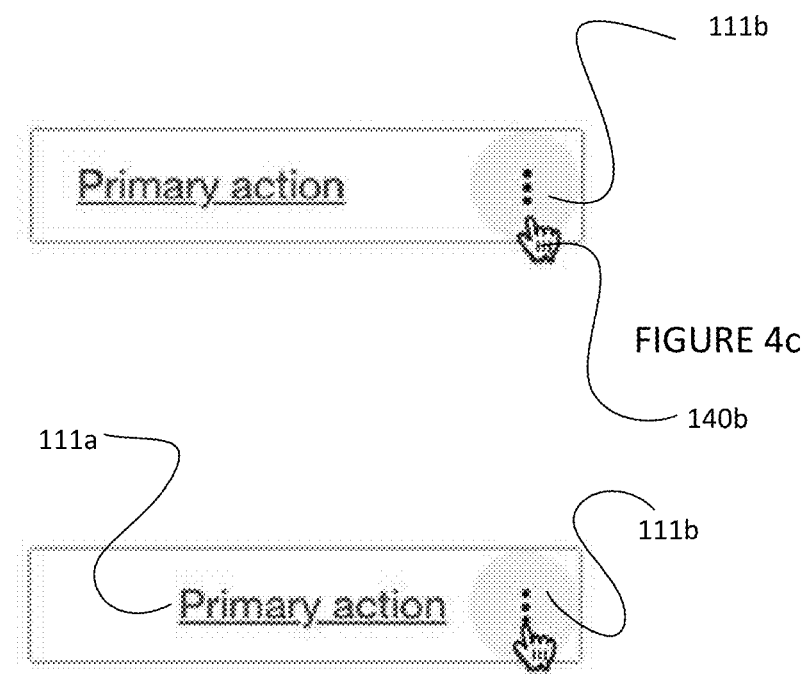
FIGURE 4c
FIGURE 4d

GRAPHICAL USER INTERFACE, METHOD, PROGRAM AND APPARATUS

CROSS REFERENCE TO RELATED APPLICATIONS

This application is a continuation of International Patent Application Serial No. PCT/NZ2023/050017, filed on Feb. 17, 2023, which claims priority to Australian Patent Application Serial No. 2022900432, filed on Feb. 24, 2022, the entire contents of which are hereby incorporated by reference.

TECHNICAL FIELD

Embodiments are in the field of human machine interfaces and specifically relate to human machine interfaces for interacting with tabular data.

BACKGROUND

Human machine interfaces such as graphical user interfaces (GUIs) provide a mechanism for humans to view and interact with electronic data by viewing such data on a display screen of a computing device. In particular, report data which may comprise information representing the state of an entity such as a legal entity or business, or a physical entity such as a machine or procedure, may be made viewable on a display of a computing device by appropriate user interaction with a graphical user interface configured to display some or all of the report data.

Tabular data is a specific form of report data that displays the report data within a digital table, and allows report data logically associated with one another to be displayed together in the same column and/or row of the table. GUIs for viewing and interacting with tabular data may be configured to simply display the tabular data in a table on the GUI, or in some instances to enable user interaction by making each cell of the table selectable via a user input mechanism such as a mouse, touchscreen, or keyboard, and to execute an associated action in response to selection. For example, such associated action may be navigation to further report data underlying the report data in the selected cell. Thus, the table is both a means to display report data and a means to navigate around the report data.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

SUMMARY

Some embodiments comprise a graphical user interface for displaying an interactive report including one or more rows of tabular data, each row of tabular data being divided into one or more cells each corresponding to a column; the graphical user interface including an interactive report viewing frame within which a plurality of the cells are displayed at a time, wherein a single cell at a time from among the displayed cells is a selected cell, the single cell being selectable by input from a user input mechanism; each displayed cell being displayed in a first display state when the cell is the selected cell, and a second display state when the cell is not the selected cell, wherein in the first display state, the cell comprises a primary element at a first location within the cell, and a secondary element at a second location within the cell, the primary element being a data point of the tabular data, and the secondary element being selectively highlighted according to input from the user input mechanism, the graphical user interface being configured to execute a secondary element action in response to a trigger input from the user input mechanism while the secondary element is highlighted; and in the second display state, the cell comprises the primary element at the first location within the cell, and the secondary element is not visible within the cell.

In some embodiments, in all or a subset of the cells: the primary element and the secondary element are individually selectively highlightable on a mutually exclusive basis according to input from the user input mechanism, the graphical user interface being configured to cause execution of a primary element action in response to a trigger input from a user input mechanism while the primary element is highlighted, and to cause execution of the secondary element action in response to a trigger input from the user input mechanism while the secondary element is highlighted.

In some embodiments, the tabular data is alphanumeric data and in each cell the primary element is a data point of the tabular data, and is a hyperlink to a respective destination within the report, the primary element action being to navigate the report viewing frame to the destination of the hyperlink of the highlighted primary element.

In some embodiments, the report is hierarchical and comprises data at a plurality of levels from a lowest level up to a highest level, wherein tabular data from one level from among the plurality of levels is displayed at a time within the report viewing frame, and wherein one or more of the plurality of levels comprises tabular data; the primary element in each cell being a hyperlink to a lower level within the report containing data logically associated with the tabular data in the respective cell.

In some embodiments, the secondary element action is a default action, the secondary element being an icon, wherein a trigger input from the user input mechanism while the icon is highlighted causes execution of the secondary element action.

In some embodiments, the secondary element action is a selectable action from an overlay menu, the secondary element being an icon, wherein highlighting of the icon, or a trigger input from the user input mechanism while the icon is highlighted, causes display of the overlay menu within the report viewing frame, from which overlay menu the secondary element action is selectable from among a plurality of selectable secondary element actions, selection of the secondary element action from the overlay menu causing execution of the secondary element action.

In some embodiments, the plurality of selectable secondary element actions in the overlay menu are cell manipulation actions, each cell manipulation action causing a modification to a form and/or a content of the respective cell in the first and second display states.

In some embodiments, the secondary element action is to associate an annotation with the selected cell according to a user annotation input, the associated annotation being represented in the cell by a tertiary element, the tertiary element being an annotation symbol mapping to the annotation, the user annotation input being a selection of the annotation from among one or more previously input annotations, or being an input of a new annotation in a freeform text entry field.

In some embodiments, a plurality of annotations are each mapped to by respective annotation symbols, the annotation symbol in the cell being represented by the tertiary element and being selectable according to a user input, and selection of the tertiary element causing display on an overlay within the report viewing frame, or display elsewhere within the graphical user interface, of the annotation.

In some embodiments, the tertiary element in a cell is individually selectively highlighted on a mutually exclusive basis with the primary element and/or the secondary element of the same cell while the cell is the selected cell, and selectable via a trigger input from a user input mechanism while highlighted, or via a cursor hover event at the location of the tertiary element.

In some embodiments, within the report viewing frame an instantaneously visible region of the tabular data is displayed at a time, the size and/or location within the tabular data of the instantaneously visible region being dynamic according to user scroll and/or zoom inputs.

Some embodiments comprise a computing apparatus comprising a processor, a memory, and a display unit, the memory storing processing instructions which, when executed by the processor, cause the processor and the display unit to implement a graphical user interface as set out in the above statements or in the appended claims.

Some embodiments comprise a server computer comprising a memory and a network interface, the server computer being configured to serve to a client computing apparatus over the network interface, a graphical user interface as set out in the above statements or in the appended claims.

Some embodiments comprise a computer-implemented method comprising: at a graphical user interface, displaying an interactive report including one or more rows of tabular data, each row of tabular data being divided into one or more cells each corresponding to a column; at the graphical user interface, displaying an interactive report viewing frame within which a plurality of the cells are displayed at a time, wherein a single cell at a time from among the displayed cells is a selected cell, the single cell being selectable by input from a user input mechanism; each displayed cell being displayed in a first display state when the cell is the selected cell, and a second display state when the cell is not the selected cell, wherein in the first display state, the cell comprises a primary element at a first location within the cell, and a secondary element at a second location within the cell, the primary element being a data point of the tabular data, and the secondary element being selectively highlighted according to input from the user input mechanism, the computer-implemented method further comprising executing a secondary element action in response to a trigger input from the user input mechanism while the secondary element is highlighted; and in the second display state, the cell comprises the primary element at the first location within the cell, and the secondary element is not visible within the cell.

Some embodiments comprise a computer program which, when executed by a computing device comprising processor hardware and memory hardware, causes the processor hardware to execute a method as set out above or in the appended claims.

Advantageously, embodiments may enhance present technology for representing tabular report data in a GUI by providing mechanisms for applying actions to a single cell without cluttering the visual interface. Furthermore, such mechanisms may be easily accessible by users using input devices such as keyboards, that don't have access to a "right click" or similar functionality that may be accessible via a mouse or other such input device.

Interactive reports are distinct from ordinary reports insofar as a user is able to interact with the displayed report data. Each cell is not merely presenting information to a user, but providing an active area or button which is functional in response to selection via a user input mechanism. For example, available actions include navigating to different levels of a report, changing the appearance of a cell, and adding explanatory annotations to cells. Embodiments provide a GUI for interacting with report data at a cellular level, with cell elements that do not clutter the visual interface while the cell is not selected, and optionally with multiple available actions per cell.

Annotations are notes linked to specific cells, which provide a user of the interactive report viewing GUI with a mechanism to provide cell specific insight for themselves in the future or for another user viewing the same interactive report data.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

BRIEF DESCRIPTION OF THE DRAWINGS

Embodiments are described with reference to the accompanying drawings, in which:

FIGS. 3a to 3l illustrate excerpts from screenshots of embodiments showing example tables;

FIGS. 4a to 4g illustrate cell display states in some embodiments;

FIGS. 5a to 5l illustrate excerpts from screenshots of some embodiments;

FIG. 6 illustrates exported tabular data from an embodiment;

DETAILED DESCRIPTION

Embodiments relate to mechanisms for display of, manipulation of, and interaction with tabular data. The tabular data may be relational data. Each row in a table is composed of multiple data points that are related to one another; for example, data points that represent the same entity, or represent values assigned to temporally adjacent time periods. Columns are formed by the vertical arrangement of plural rows, such that the equivalent data points at each row (e.g. representing the same property) are horizontally aligned with one another. It can be appreciated, logically, that whilst each cell is an instance of a cell object at code level and thus inherits features from the cell object class, each cell may also inherit features from a row object class, column object class and/or table object class. Classes effectively define templates that determine how instances of the class are displayed and what features or parameters they have. Instances of the class may have default values of parameters or default features, may inherit values as members of a group (for example cell objects belonging to a particular row may inherit features or values collectively), or may have individually defined values of the parameters or instances of the class features. As an example, embodiments may provide users with the option to enable or disable a secondary element action option (which would have the effect of always displaying tabular data in a second display state regardless of being selected or unselected), which option may be implemented on a global basis (i.e for the whole report), on a hierarchy level basis, or on a row or column basis within a table.

Figure 1:
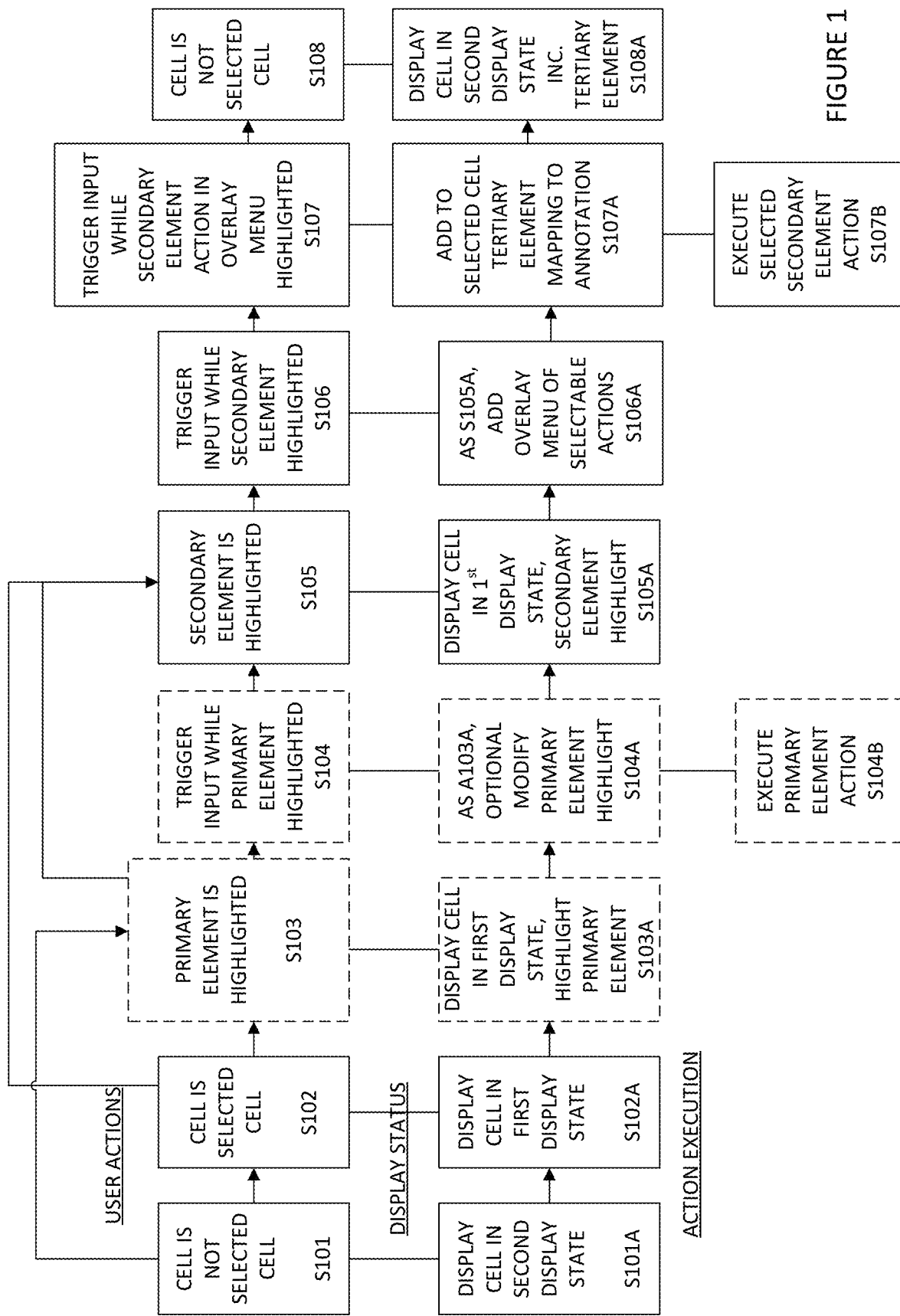
FIG. 1 is a flowchart illustrating flow of processing and change of display states according to some embodiments.

FIG. 1 illustrates a flow of processing in some embodiments. The flow of processing progresses from left to right, according to user action, and is divided into three threads: user actions in the uppermost flow; display status of a cell in the middle flow; and action execution in the lowermost flow. User actions caused by, for example, using a tab input button, a directional key, or a mouse or other input mechanism are illustrated in the flow of actions S101 to S108 from left to right (assuming repeated press of forward tab or right input key in addition to trigger inputs such as return key at S104 and S107). Exceptions are explained below, including where steps may be omitted, or where steps are defaults and so no user action is required to progress between steps. Changes in display state S101a to S108a resulting from the user action S101 to S108 are linked to the respective user actions by vertical lines, similarly action execution processing is linked by a corresponding vertical line.

Initially, at S101, the cell is not the selected cell (i.e. because no cell or another cell is selected) and so at S101A the cell is displayed in the second display state. In the second display state, the cell comprises the primary element (i.e. the data point of the tabular data) at a first location within the cell, and no visible secondary element (wherein the secondary element, when visible, is an icon causing display of an overlay menu). Optionally, a tertiary element being an icon or reference symbol mapping or linking to an annotation may be visible. In this example it is assumed that at the timing of S101A no annotation has yet been added to the cell and so in the second display state only a primary element is displayed (note contrast with S108A).

The user causes the pertinent cell to be the selected cell, for example by directional key, tabbing, or cursor movement and trigger, and thus the flow proceeds to S102. Accordingly, the display status changes at S102A and the cell is displayed in the first display state in which the secondary element is visible. For example, the secondary element may be a selectable icon which, if selected, causes display of an overlay menu. The cell rendering may be modified in other ways in moving from second to first display state, such as increasing line width or opacity of a border line, shading, etc.

At S103 the primary element is highlighted. It is noted that there may be no positive user action from S102 to S103, that is, the primary element may be highlighted by default upon the cell becoming the selected cell at S102. Thus, S103 may be caused by the same user action causing the flow to proceed from S101 to S102. By being highlighted, for example, the primary element may be underlined, emboldened, outlined, shaded, or otherwise rendered in a manner which makes the element distinct from other primary elements visible in other cells. It is noted that S103 is optional insofar as some cells may instantiate a first cell class (in which the primary element is a data point and is selectable to cause execution of a primary element action), and some cells may instantiate a second cell class (in which the primary element is merely to display a data point and is not selectable).

In the case of the first cell class, the primary element is selectable and highlightable and so steps S103 and S104 follow from S102. In the case of the second cell class, the primary element is not highlightable and selectable, and so the secondary element highlighting S105, S105A is the default.

The dashed lines at flowchart components S103, S103A, S104, S104A, S104B indicate those cells are optional in accordance with whether the cell instantiates the first cell class or the second cell class.

Assuming the cell instantiates the first cell class, the primary element is highlighted at S103 by user action, for example by selection of the cell and the primary element highlighting being the default. At S103A the cell remains in the first display state (with the secondary element visible), but the primary element is highlighted.

Flow is caused to proceed from S103 to S104 by a trigger input while the primary element is highlighted. For example the trigger input may be mouse button press, carriage return press, or by a voice command indicating selection of the highlighted primary element. The associated display state at S104A is as S103A, but with the optional modification of the primary element to indicate that is has been selected (which modification may remain for the duration of the user session). For example, font colour may be changed from blue to purple. Corresponding action execution at S104B is the execution of the primary element action. For example, said execution may be the opening of a new frame which is navigated to report data underlying or otherwise logically associated with the data point of the primary element.

A further tab, directional input, or appropriate movement of the mouse cursor from either the primary element (in the case of the primary element being highlightable according to the first cell class) or from the preceding cell (in the case of the primary element not being highlightable to that the secondary element is highlighted by default) moves the flow to S105. As illustrated at S105A, the cell is displayed in the first display state (i.e. the secondary element is visible) and the secondary element is highlighted. For example, the secondary element may be an icon whose background is shaded in the highlighted state and not shaded otherwise.

Processing is caused to proceed from S105 to S106 by a trigger input while the secondary element is highlighted. For example the trigger input may be mouse button press, carriage return press, or by a voice command indicating selection of the highlighted secondary element. The associated display state at S106A is as S105A, but with the overlay menu of selectable actions caused to be displayed by selection of the secondary element.

The overlay menu comprises plural selectable actions (secondary element actions) which are individually highlightable and selectable via user inputs including, for example, use of directional up and down keys to move between menu items, or cursor movement. The flow is caused to proceed from S106 to S107 by a trigger input (such as carriage return key, mouse button click, voice command) while a menu item corresponding to a secondary element action is highlighted. At S107B the secondary element action is executed. In some embodiments, the secondary element action is to implement a processing flow to add an annotation to a cell. The processing flow may have one or more steps and may include entry of an annotation into a free text field, or selection of an existing annotation already included in the report in respect of another cell. A consequence of said processing flow is the addition of a tertiary element to the cell, being a reference sign or symbol mapping to the annotation text. For example, there may be plural annotation texts included as footnotes to the report and each having a respective reference sign. Annotation texts may be displayed in a separate frame from the report viewing frame so that the user does not need to scroll the report viewing frame to the bottom of the report to see the annotation text. Highlight and selection of the tertiary element may cause display of the annotation text associated with the respective reference sign in said separate frame. The display state associated with S107 is S107A, in which it is assumed that a tertiary element was added by the processing at S107B.

Depending on the configuration, a further user action (not displayed) such as a tab or directional key press from S107 may cause the tertiary element to be highlighted which is selectable by a trigger input causing the annotation to be displayed. Alternatively, it may be that no tertiary element was added, or that tertiary elements are not highlightable.

A next user action from the secondary element being highlighted, or the tertiary element being highlighted, causes the flow to proceed to S108 and the next cell to be selected, and thus the pertinent cell is no longer the selected cell. At S108A the cell therefore returns to the second display state in which the secondary element is not visible. However, if a tertiary element was added by the processing at S107B, the tertiary element is visible in the cell.

Figure 2A:
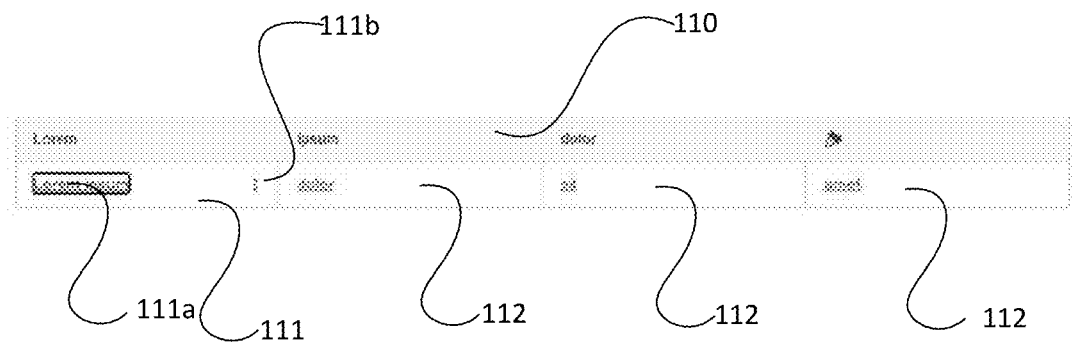
FIGS. 2a to 2d illustrate example GUIs showing different display states of cells according to some embodiments.
Figure 2B:
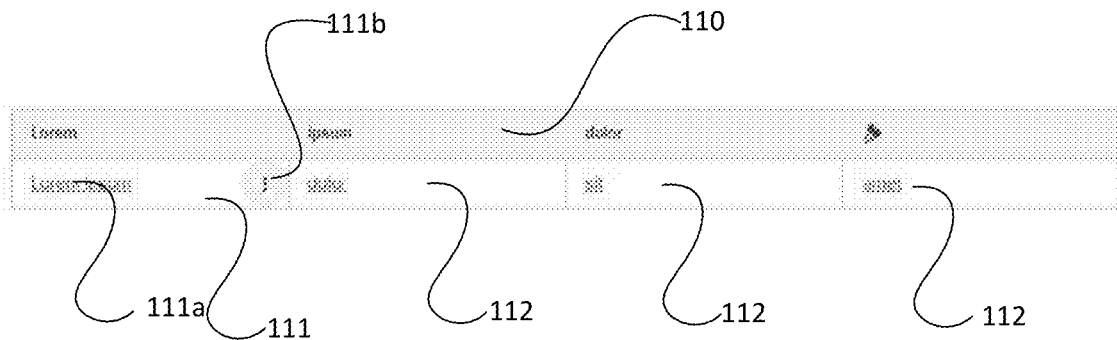

FIG. 2a illustrates exemplary tabular data, which is tabular data forming part of an interactive report for display within an interactive report viewing frame. The tabular data is headed by a header row 110, which provides a descriptor per column, wherein a data point at each cell within the column is a particular value or instance of the descriptor. In some embodiments, within the report viewing frame an instantaneously visible region of the tabular data is displayed at a time, the size and/or location within the tabular data of the instantaneously visible region being dynamic according to user scroll and/or zoom inputs. In the illustrated embodiment, the tabular data comprises a single row of tabular data, so that there is a single data point per column. FIGS. 2a to 2d illustrate the same cells in a progression illustrating the changes caused to the GUI by different user inputs, such as tabbing, using directional keys or mouse clicks. In FIGS. 2a to 2d, all cells instantiate a first cell class in which the cells comprise a primary element and a secondary element, and the primary element and the secondary element are individually selectively highlightable on a mutually exclusive basis according to input from the user input mechanism. The graphical user interface is configured to cause execution of a primary element action in response to a trigger input from a user input mechanism while the primary element is highlighted, and to cause execution of the secondary element action in response to a trigger input from the user input mechanism while the secondary element is highlighted.

Report data composed of cells instantiating the first cell class (in which the primary element is a data point and is selectable to cause execution of a primary element action) and a second cell class (in which the primary element is merely to display a data point and is not selectable) is illustrated in FIGS. 3a to 3l.

In the single row of tabular data of FIG. 2a, the first cell (the left-most cell) is the selected cell 111, and the remaining three cells are non-selected cells 112. The selected cell 111 is displayed in a first display state (for as long as it is the selected cell). The non-selected cells 112 are displayed in a second display state. In the first display state, the cell comprises a primary element 111a at a first location within the cell, and a secondary element 111b at a second location within the cell, the primary element and the secondary element being individually selectively highlighted on a mutually exclusive basis according to input from the user input mechanism. In the example of FIG. 2a, the selected cell 111 is identifiable as the selected cell (rather than a non-selected cell) in two ways: firstly by the visibility of the secondary element 111b in the cell (noting that no secondary element is visible in the non-selected cells 112); and secondly by the highlighting of one of the elements. In the example of FIG. 2a the primary element 111a is highlighted as denoted by the black box outlining the primary element 111a. According to some embodiments, a selected cell may be identifiable as a selected cell based on a different visual feature, which may include one or more of colour, line style, or font style, for example.

The selected cell is selectable according to input from a user input mechanism. The user input mechanism may be, for example, a mouse, a trackpad, a keyboard, a voice input system, an eye-gaze system, or a touch screen. Noting also that a user may be using a combination of user input mechanisms to interact with the GUI. Each input mechanism will be configured at the operating system level of the user device on which the GUI is implemented to perform selection and scrolling functions. Furthermore, the GUI itself may be configured to respond to user inputs in particular ways. In the scenario in which a keyboard is a user input mechanism, it is established at an operating system level that tabbing or directional key scrolls through selectable objects in a frame. However, the GUI is specifically configured so that tabbing or use of directional keys within the tabular data via the keyboard as input mechanism scrolls through the primary and secondary elements of the cells, i.e. tabbing forward from the state illustrated in FIG. 2a would cause the display of the tabular data within the GUI to change to the state illustrated in FIG. 2b, the change being the secondary element 111b of the first cell to be highlighted instead of the primary element 111a. The selected cell 111 would still be the first cell. A further tab forward (see FIG. 2d) would change the selected cell from the left-most cell to the second left-most cell, and the primary element of that cell would be highlighted. Furthermore, by virtue of the change in selected cell, the left-most cell would be displayed according to the second display state (the secondary element would disappear), and the second left-most cell would be displayed according to the first display state (the secondary element would be displayed).

In the alternative example of a mouse, trackpad, eye-gaze, or touchscreen input mechanism, in a first technique for responding to inputs, a first trigger input (i.e. mouse click, touch, etc) at a cell (regardless of location within the cell) may cause the cell at the location of the trigger input (i.e. the cursor position or touch position) to become the selected cell and the primary element to become the highlighted element, by default. The secondary element becomes visible in response to the first trigger input. Then, a second trigger input following the first trigger input has a differential effect depending on position within the cell, wherein a second trigger input at the first location within the cell (being the location of the primary element) causes execution of an action (i.e. a primary element action) defined by the primary element. Alternatively, the second trigger input at the second location within the cell (being the location of the secondary element) causes the secondary element to become highlighted instead of the primary element. Subsequently, a trigger input at the location of the secondary element whilst it is highlighted causes execution of the action defined by the secondary element (i.e. the secondary element action). In other words, for cells instantiating the first cell class: while an element is highlighted, a trigger input from a user input device (i.e. carriage return key, left mouse click, touchscreen push) at the relevant location, causes execution of the action defined by the element.

Figure 2C:
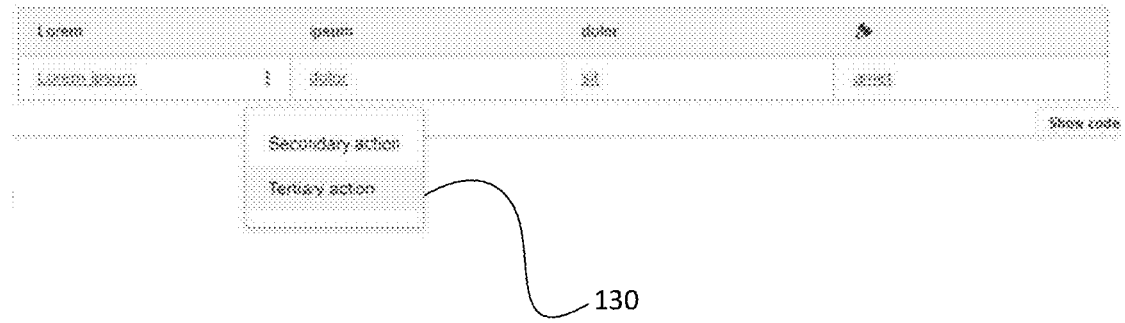

Execution of an action may be default (i.e. direct/automatic), insofar as no further user input is required, or the action may be selectable (i.e. indirect/semi-manual), insofar as further user input is required as part of the action or in order to initiate the action. For example, the secondary element action defined by the secondary element may be cell annotation, but cell annotation may be a default action on selection of the secondary element 111b, or may be selectable via an overlay menu 130, as illustrated in FIG. 2c. So that the initial processing response to highlight of the secondary action indicator, or to a trigger input while the secondary element is highlighted, is display of an overlay menu 130 via which cell annotation is a selectable option. Furthermore, as illustrated in FIG. 2c, alternative secondary element actions may be selectable via the overlay menu 130.

Depending on the configuration of the GUI, the overlay menu 130 may be displayed automatically upon highlighting of the secondary element (either immediately or after a predefined delay), or it may require a selection input via a user input mechanism while the secondary element is highlighted. Such a selection input may be a cursor hover event at the secondary element, a mouse click while the cursor is at the secondary element, a carriage return while the secondary element is highlighted, etc.

In the example illustrated in FIGS. 2a-d, that is, for cells instantiating the first cell class, the data points of the tabular data, which are represented as or by the primary elements, are alphanumeric data, and are hyperlinks. The primary element action is to follow the hyperlink (i.e. to navigate the report viewing frame of the GUI to the destination defined by the relevant hyperlink). For example, the hyperlink may navigate to a different region of the interactive report, which may be at a different hierarchical level, for example at a lower or lowest level or higher or highest level underlying the level containing the hyperlink and containing data points upon which the data point of the hyperlink is based.

Figure 2D:
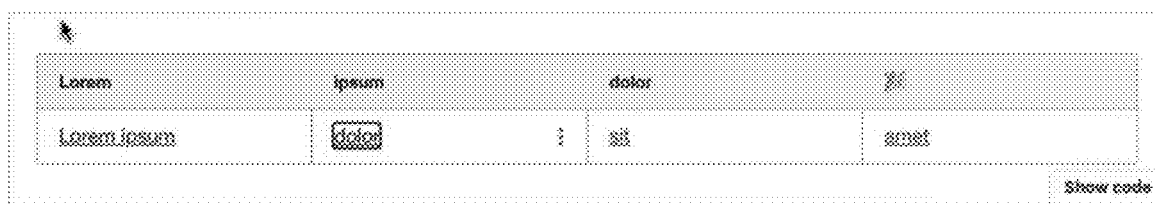

FIG. 2d illustrates the change in display states of the first- and second-left-most cells when the selected cell changes from the left-most-cell to the second-left-most cell. The change may be effected via a touchscreen (i.e. touch on the second-left-most cell), via tabbing on a keyboard, via eye gaze input, or via a mouse cursor hover or mouse click at the location of the second left-most-cell.

FIG. 2d shows the left-most-cell in the second display state, in which the secondary element 111b is not displayed, and the second-left-most-cell in the first display state, in which the secondary element 111b is displayed. The primary element 111a is highlighted in the second-left-most cell in FIG. 2d, as indicated by the box surrounding the data point text.

FIG. 3a shows a report comprising cells in a first (i.e. left-most) column that instantiate a second cell class, comprising, as primary element, a data point 121a (or representation of a data point) which is not highlightable or selectable and thus has no action associated therewith, and, as secondary element, an icon which is displayed while the cell is the selected cell and is not displayed otherwise. The cells of the third and fourth columns also instantiate the second cell class (i.e. the data points are not highlightable or selectable to cause execution of an action), whereas the cells of the second and fifth columns comprise a mixture of cells instantiating the first cell class (first and fourth rows), in which the data point 121a doubles as a highlightable selectable element to cause execution of a defined action (the primary element action), and cells instantiating the second cell class. The secondary element 111b of the second cell class is the same as the secondary element 111b of the first cell class, the difference between the two cell classes being the status of the data point as a highlightable and selectable element (in the first cell class) or simply as a representation of a data point (in the second cell class) and which is not highlightable or selectable.

In FIG. 3a, the selected cell is the top-left cell, in which the secondary element 121b is displayed. The selected cell is selectable via user inputs, such as tabbing, cursor hover, cursor clicking, etc. The top left cell is illustrated in the first display state in which the secondary element 121b is displayed. This is contrasted with the other cells of the first column, which are displayed in the second display state in which the secondary element 121b is not displayed.

Cells instantiating either or both of the first and second cell classes may also be configured to include a tertiary element 121c, in accordance with actions initiated by the user. For example, the secondary element action may be to add an annotation to a cell, in which case a tertiary element 111c, 121c is added to the cell. In the cells illustrated in FIG. 3a, all of the cells include the same tertiary element 111c, 121c. There is a single annotation symbol, a numeric symbol "1", that is displayed in every cell.

The annotation symbol may have been added to the cells individually, or on a row or column level basis. For example, on selection of a secondary action for a particular cell, the user may be presented with selectable options to add the annotation symbol to the selected cell only, to the entire row of cells, or to the entire column of cells.

At FIG. 3b, the selected cell is the second-left-most cell of the top row, and the highlighted element is the primary element 111a. The selected cell instantiates the first cell class, and so the primary element is a highlightable and selectable element which causes execution of a defined action upon selection. In the example of FIG. 3b, the primary element 111a is highlighted. The secondary element 111b of the cell is displayed in the selected cell only (i.e. the cell is in the first display state). In the remaining cells the secondary element is not displayed, and so those cells are in the second display state. The tertiary element 111c is an annotation symbol.

At FIG. 3c, the cursor has been moved downward to the second row and so the secondary element 121b is visible in the second-left-most cell of the second row. The selected cell belongs to the second cell class and so the primary element 111a is not highlightable and selectable to cause execution of an action; it simply represents a data point from the tabular data.

At FIG. 3d, further movement of the cursor to the location of the secondary element 121b causes highlighting of the secondary element 121b.

Figures 3E, 3F:
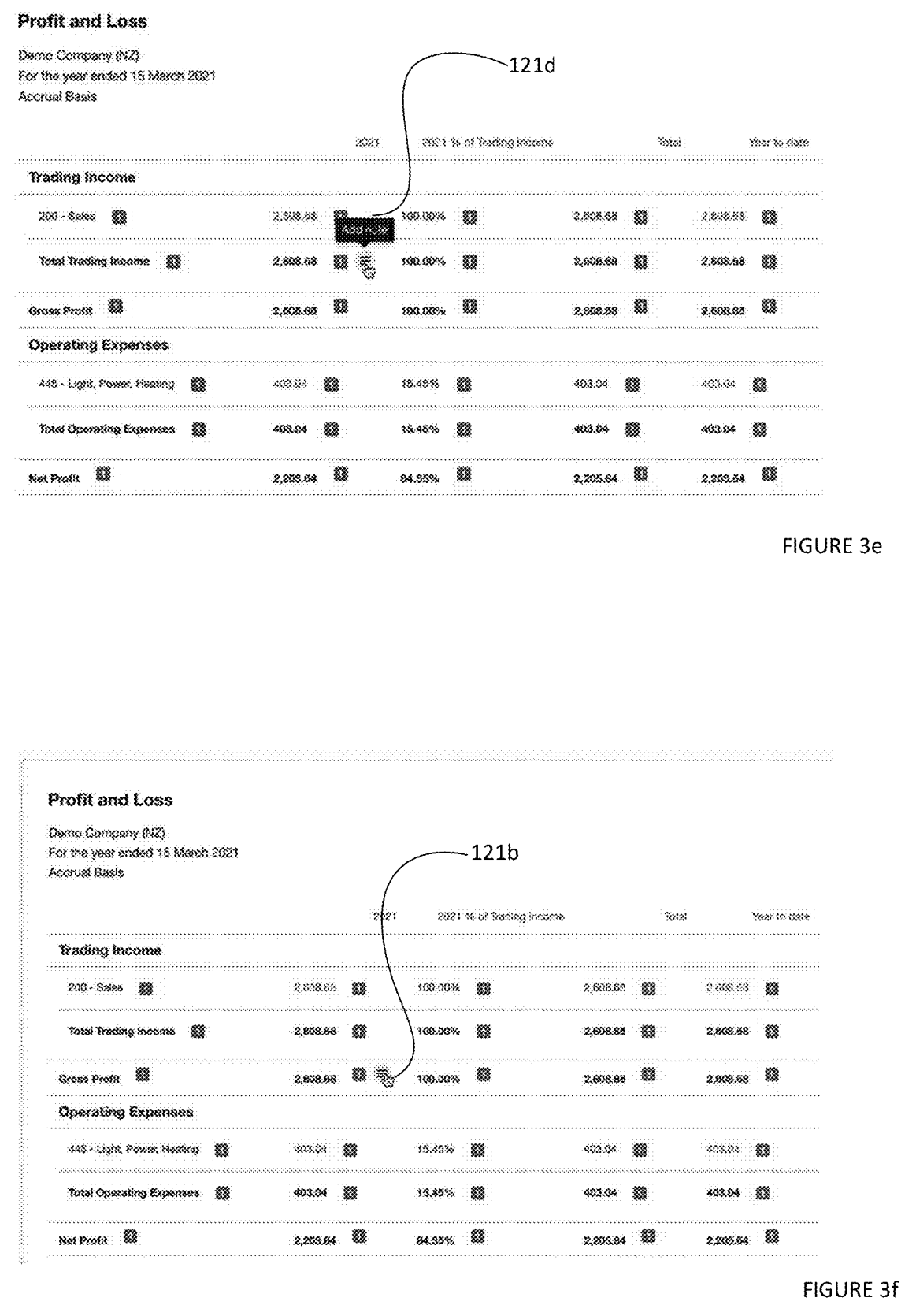

At FIG. 3e, the GUI responds to a cursor hover event at the location of the secondary element 121b by displaying a popup descriptor 121d which describes the secondary element action to a user. The hover event is defined by presence of the cursor at the secondary element for more than a predefined time duration, such as 500 ms.

At FIG. 3f the cursor is moved down one row, so that the second left-most cell of the third row becomes the selected cell, as indicated by the display of the secondary element 121*b*, which is also highlighted. Highlighting is visually indicated by the shaded circle behind the icon of the secondary element 121*b*.

Figures 3G, 3H:
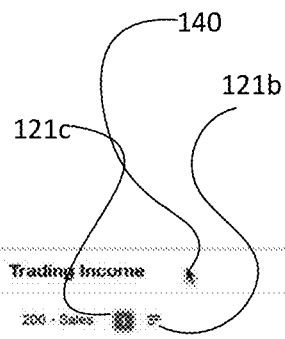

At FIG. 3*g*, the cursor is moved to the third-most cell of the bottom row, which becomes the selected cell, and the secondary element 121*b* is visible, though is not highlighted.

In FIGS. 3*a* to 3*g* the user input is from a pointing device such as a trackpad, eye gaze, or mouse, so the selected cell and the highlighted element within the cell conforms to the cursor location. By contrast, at FIG. 3*h* the user input is from a keyboard, via tabbing or directional keys. Therefore, whilst the cursor 140 is in the header row, the selected cell is the left-most-cell of the top row of data, as denoted by the display of the secondary element 121*b* in that cell. FIG. 3*h* further illustrates that the tertiary element, the annotation symbol, which may be added to cells instantiating the first or second cell class, is a highlightable element. The highlighting of element 121*c* is indicated by the shading around the blue box.

Figures 3I, 3J:
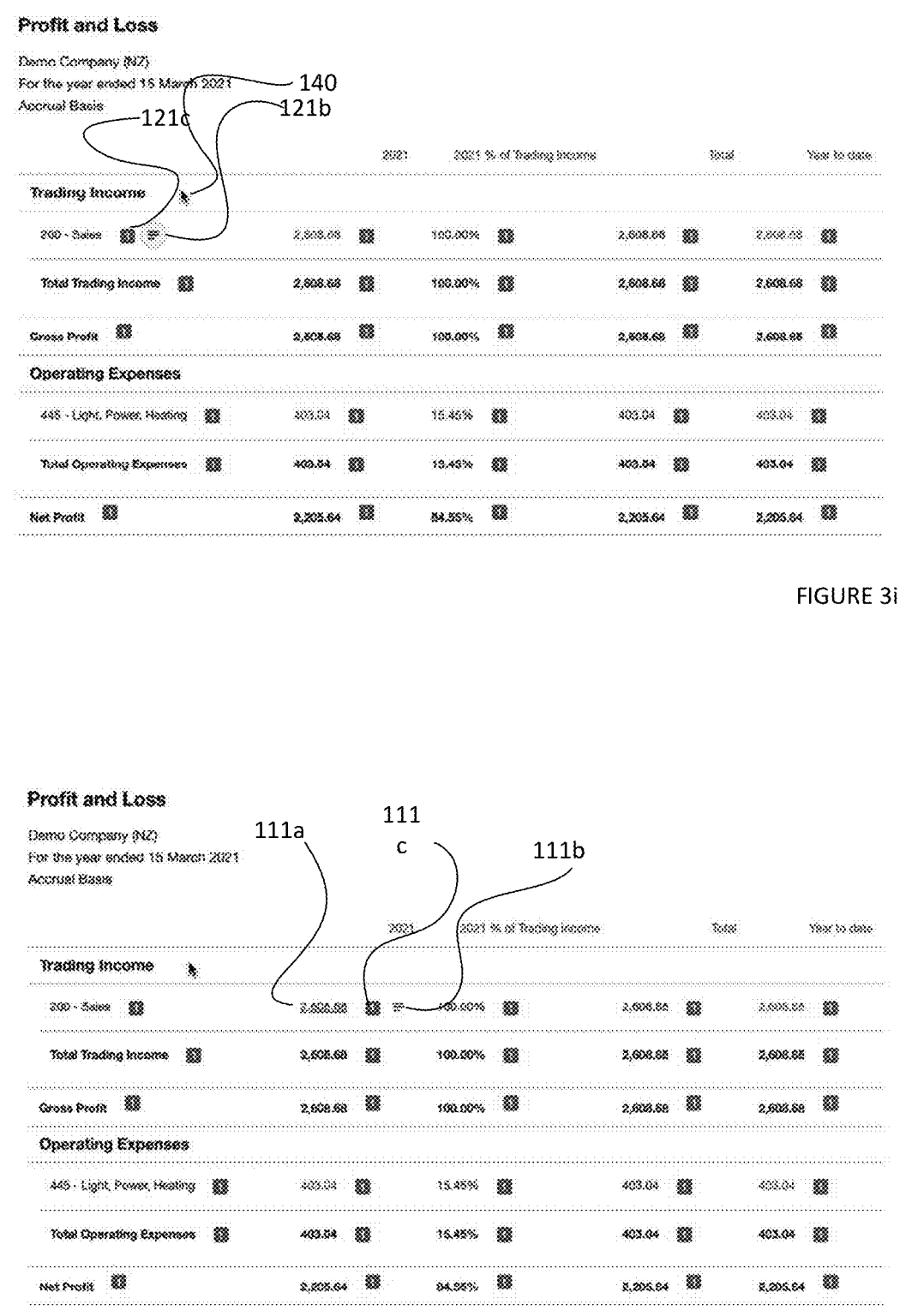

FIG. 3*i* illustrates the effect of a press of a forward tab or right directional key (or equivalent input) from the state of FIG. 3*h*. The tertiary element 121*c* is no longer highlighted, but the secondary element 121*b* is highlighted, as indicated by the shading behind the icon.

FIG. 3*j* illustrates the effect of a press of a forward tab or right directional key (or equivalent input) from the state of FIG. 3*i*. The selected cell moves by one cell to the right, the second-left-most cell of the top row, as indicated by the secondary element 111*b* being displayed in that cell. Since the selected cell belongs to the first cell class, the primary element is highlightable and selectable, and so following directional or tabbing progression into the cell from the left, the primary element, as the left-most element in the cell, is highlighted initially. At FIG. 3*j*, the highlighting of the primary element 111*a* is indicated by the underlining of the text of the data point.

FIG. 3*k* illustrates the effect of a user continuing the left to right progression via the keyboard as input mechanism, either by tabbing forwards or by directional keys. The tertiary element 111*c*, by virtue of being the element immediately to the right of the previously highlighted primary element 111*a* (see FIG. 3*j*), is now highlighted. The highlighting of the tertiary element is indicated by the shading around the tertiary element (the annotation symbol).

FIG. 3*l* illustrates the effect of a user continuing the left to right progression via the keyboard as input mechanism, either by tabbing forwards or by directional keys. The secondary element 111*b*, by virtue of being the element immediately to the right of the previously highlighted tertiary element 111*c* (see FIG. 3*k*), is now highlighted. The highlighting of the secondary element is indicated by the shading around the secondary element 111*b* (the icon).

Reverse directional tabbing or left directional key inputs would have the effect of going from the state illustrated in FIG. 3*l* to the state illustrated in FIG. 3*k*, then to FIG. 3*j*, then to FIG. 3*i*, then to FIG. 3*h*. That is, the highlighted element progresses along the row from right to left, the selected cell being the cell in which the currently highlighted element resides.

FIG. 4*a* illustrates a cell belonging to the first class (i.e. the primary element 111*a* is highlightable and selectable to cause execution of a processing action) and without a tertiary element, but wherein the cell is the selected cell, as indicated by display of the secondary element 111*b*. In the example of FIG. 4*a*, the cursor 140 is over the cell and so the cell is the selected cell and is displayed in accordance with the first display state in which the secondary element 111*b* is visible. Optionally, the secondary element 111*b* may be displayed immediately upon the cursor being over the cell, or there may be a predefined hover delay, for example, 100 ms, 200 ms, 500 ms, during which time the cursor must be continuously over the cell for the cell to become the selected cell and thus the secondary element 111*b* to appear. However, since the cursor 140 is over neither the primary element 111*a* nor the secondary element 111*b*, neither is highlighted. Depending on the configuration of the object classes, cells of the first class may be structured with the primary element 111*a* left-aligned and the secondary element 111*b* right-aligned. The optional tertiary element, which may be an annotation symbol added in accordance with user inputs in executing the secondary action, may appear to the right of the primary element 111*a* when present.

The annotation symbol links to an annotation assigned the same symbol, wherein, for example, the annotation is freeform text input by the user which provides commentary relating to the data point of the respective cell. Depending on the configuration of the GUI, a trigger input from a user input mechanism while the annotation symbol is highlighted causes display of the annotation itself (i.e. the freeform text) in the graphical user interface. The form of the display of the annotation depends on the configuration of the GUI, and may be in a pop-up window on top of the report viewing frame, or may be in a separate frame of the GUI. The secondary element action is to associate an annotation with the selected cell according to a user annotation input, the associated annotation being represented in the cell by a tertiary element, the tertiary element being an annotation symbol mapping to the annotation, the user annotation input being a selection of the annotation from among one or more previously input annotations, or being an input of a new annotation in a freeform text entry field. Optionally, a plurality of annotations are each mapped to by respective annotation symbols, the annotation symbol in the cell being represented by the tertiary element and being selectable according to a user input, and selection of the tertiary element causing display on an overlay within the report viewing frame, or display elsewhere within the graphical user interface, of the annotation.

FIG. 4*b* illustrates a cell in the same state as FIG. 4*a*, but with an alternative icon for the secondary element 111*b*. The icon for the secondary element 111*b* is an icon associated with additional options. FIG. 4*c* illustrates the effect of moving, via user input mechanism such as eye gaze, trackpad, or mouse, the cursor to the location of the secondary element 111*b* in the cell of FIG. 4*b*. The secondary element 111*b* is highlighted, as indicated by the shaded circle behind the icon, and the cursor 140 icon changes from an arrow into a hand, providing an indication to the user that the icon is selectable.

FIG. 4*d* illustrates a cell in the equivalent state to the cell of FIG. 4*c*. In the cell of FIG. 4*d*, the class object to which the cell belongs, i.e. the first cell class, is configured with the primary element 111*a* centrally aligned. The secondary element 111*b* is still right aligned.

Figure 4E:
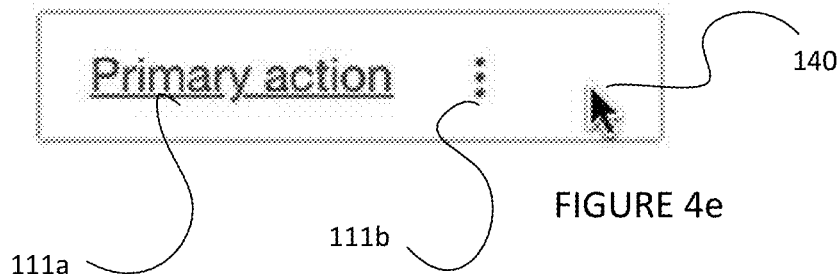

FIG. 4*e* illustrates a cell in the same state as in FIG. 4*b*. The cell is a cell of the first cell class (i.e. the primary element 111*a* is highlightable and selectable to cause a processing action), and the cell is the selected cell so the secondary element 111*b* is displayed in the cell. In the example of FIG. 4*c*, the first cell class is configured so that the secondary element, when displayed, appears to the right hand side of the primary element and with a predefined minimum spacing between the elements. That is, the position of the secondary element 111b within the cell is determined by the lateral position of the right hand side of the primary element 111a.

Figure 4F:
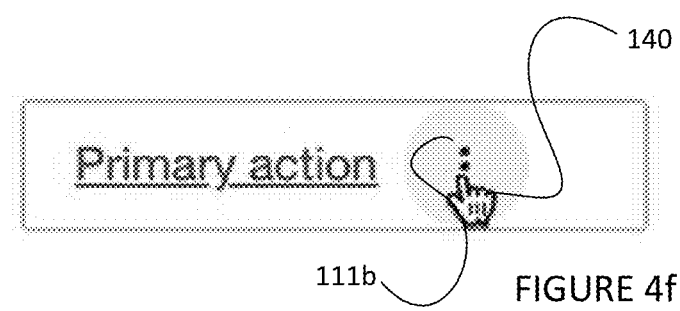

FIG. 4f shows the same cell as FIG. 4c, and illustrates the effect of moving the cursor so that it is over (cursor 140 being "over" an element indicates that its location overlaps the element) the secondary element 111b, so that the secondary element 111b is highlighted. Highlighting is indicated by the circular shading behind the icon. The cursor 140 icon changes from an arrow into a hand, providing an indication to the user that the icon is selectable.

Figure 4G:
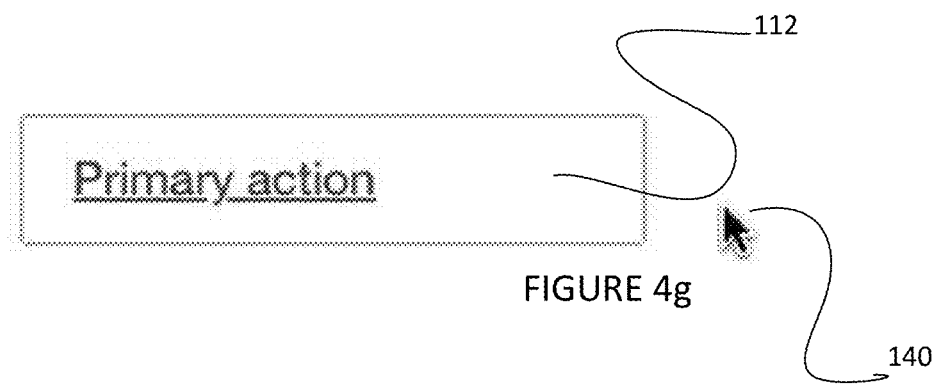

FIG. 4g illustrates the effect of moving the cursor 140 outside of the cell 112, so that the cell 112 is no longer the selected cell. The cell 112 is now displayed according to the second display state, in which the secondary element is not displayed in the cell.

Figure 5A:
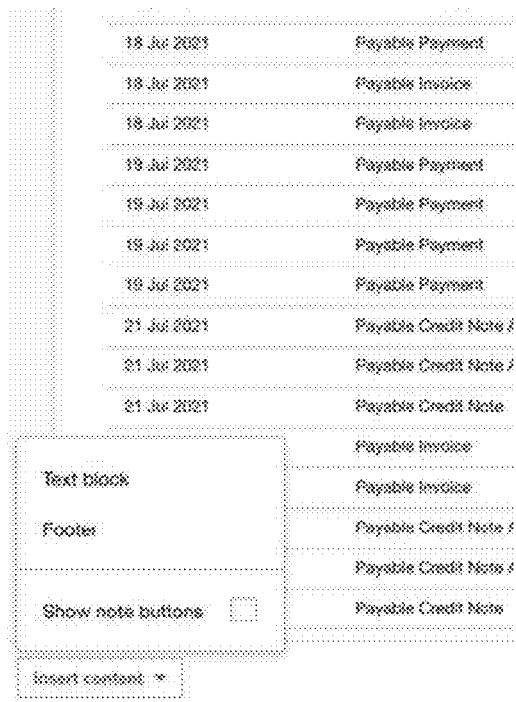
Figure 5B:
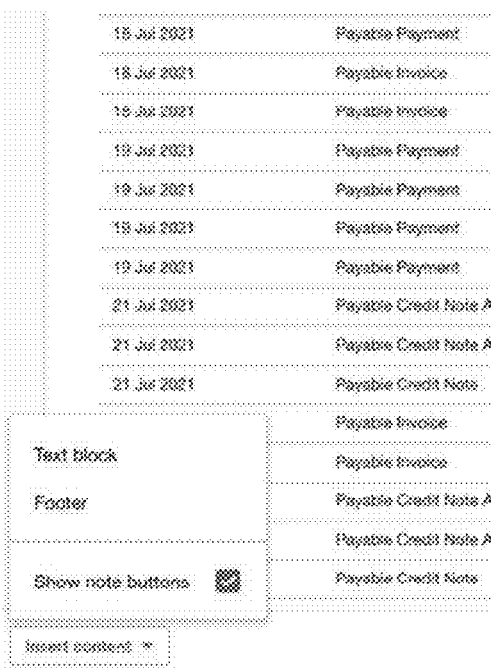

FIGS. 5a and 5b illustrate that the second display state can be turned on (FIG. 5b) and off (FIG. 5a) as a selectable parameter via a menu in the GUI. In the particular example illustrated, the second display state is described as "show note buttons", since the extra functionality accessible via the secondary element 111b may relate to annotations. Only a subset of the tabular data is illustrated in FIGS. 5a and 5b, noting that the GUI shows additional columns and rows to those illustrated.

Figures 5C, 5D:
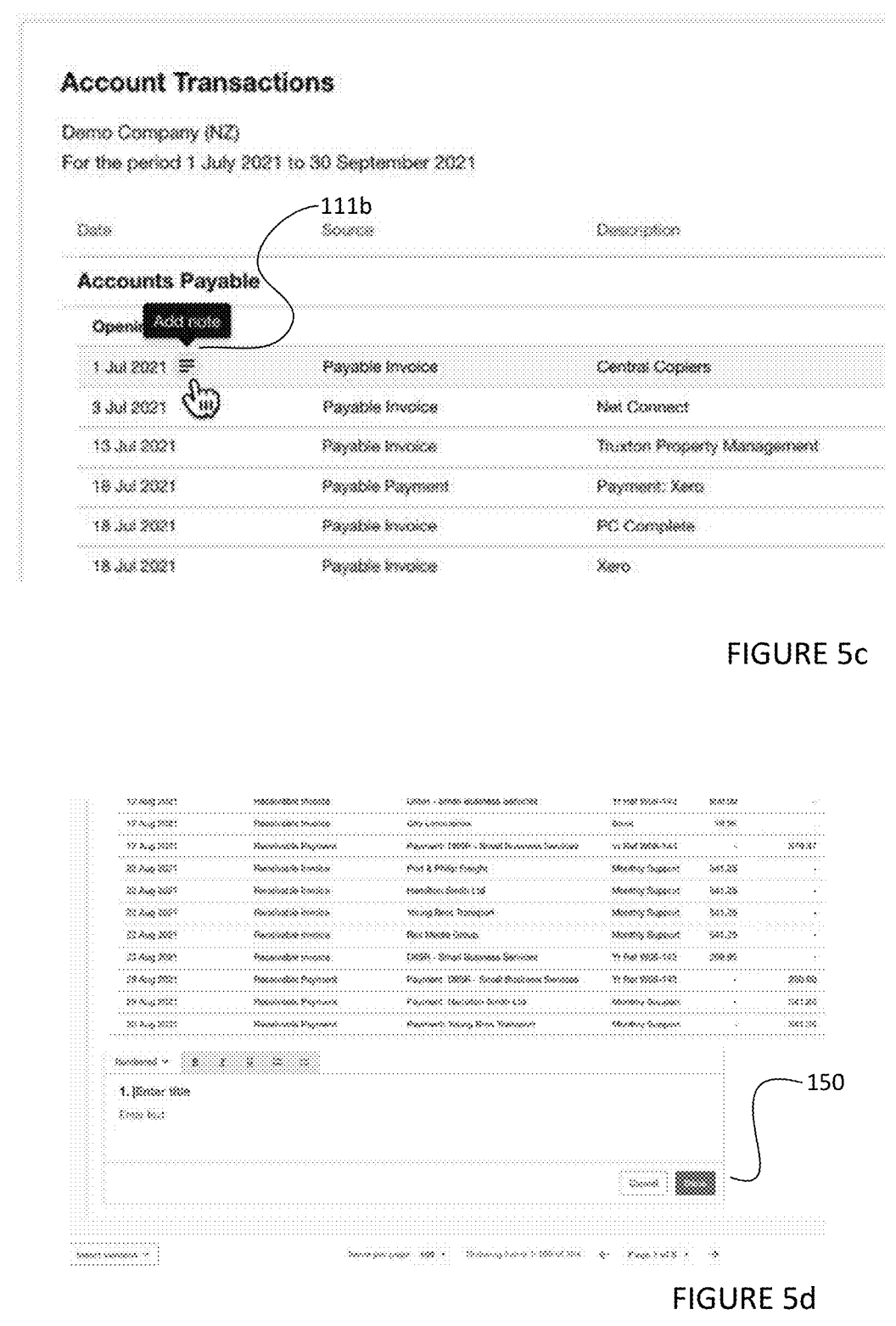

FIG. 5c illustrates a different region of the tabular data of the same GUI, and illustrates that once the show note buttons feature is selected as in FIG. 5b, the second display state is turned on and the selected cell, which in the illustrated example is selected by virtue of coinciding with cursor location, is displayed in the second display state with secondary element 111b displayed. In the example of FIG. 5c the secondary element 111b is accompanied by an explanatory bubble describing the associated functionality to a user.

As illustrated in FIG. 5d, selection of secondary element 111b in FIG. 5c causes a free text entry dialog box 150 to be opened at a location within the GUI, in this case at the base of the frame, in which free text entry dialog box a user may enter an annotation to be stored in association with the relevant cell (i.e. the cell from which the secondary element was selected).

Figures 5E, 5F:
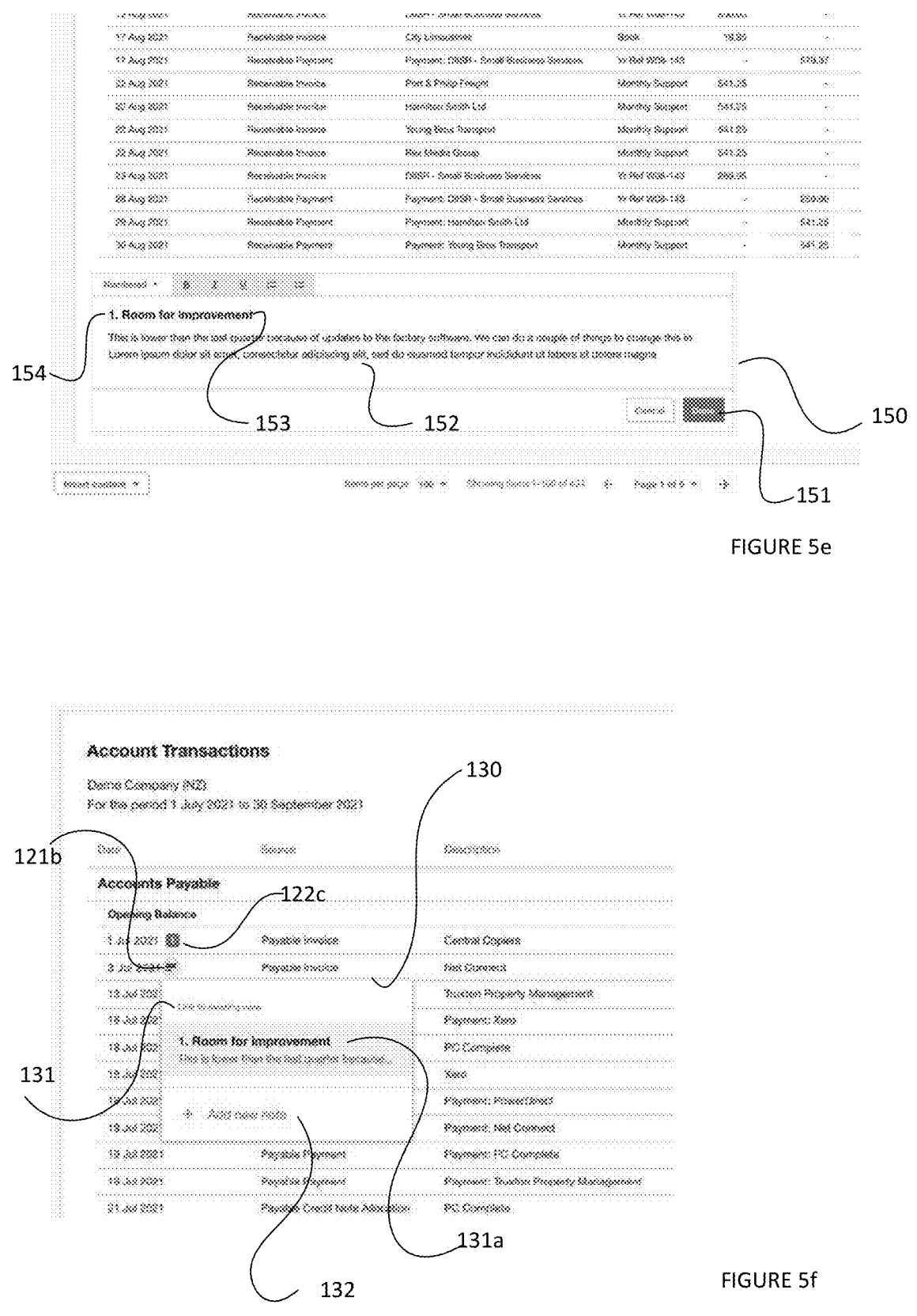
Figures 5G, 5H:
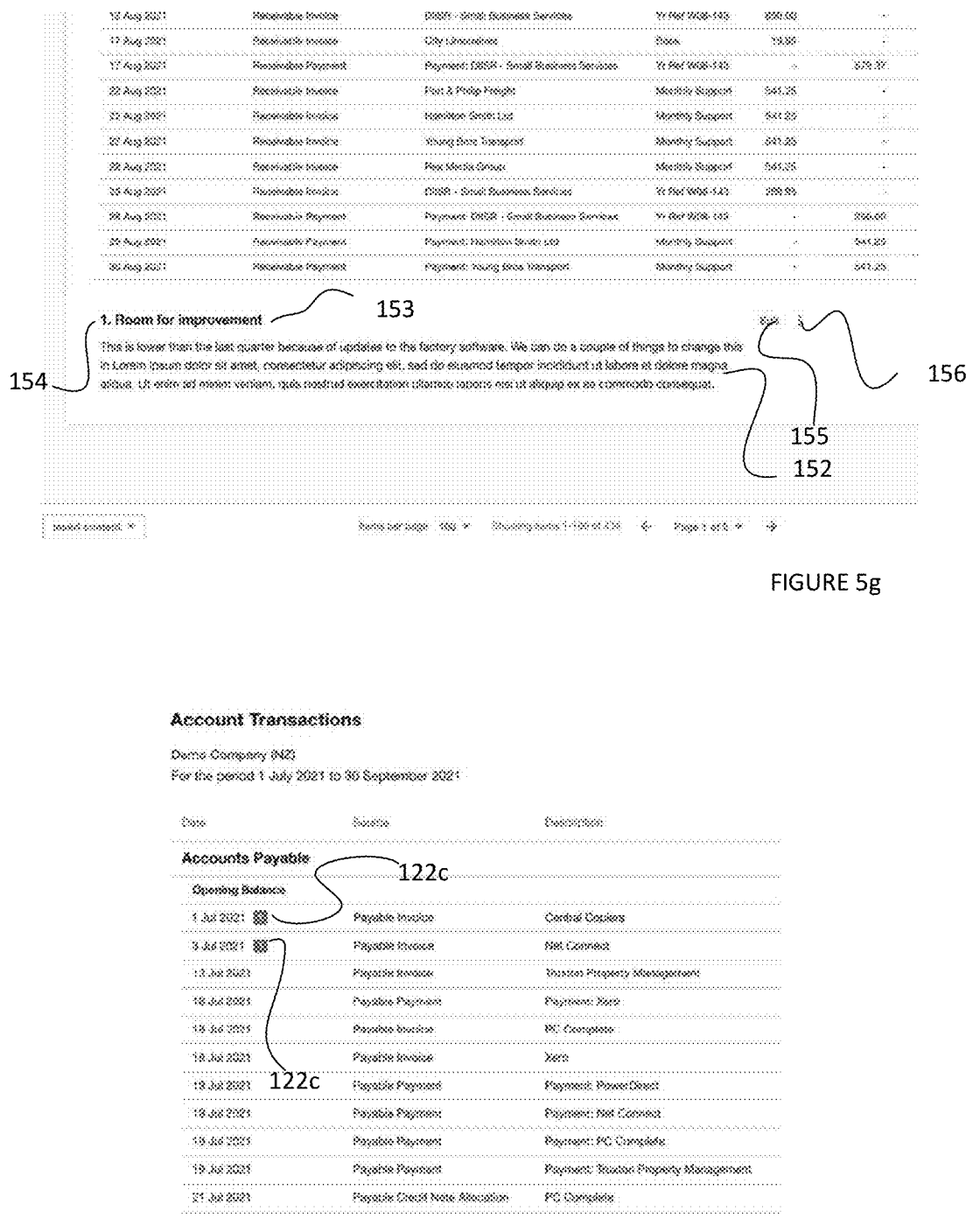

FIG. 5e illustrates the free text entry dialog box 150 having received title 153 text and body text 152 from a user, for example via a keyboard or other text input means. Selectable box 151 enables a user to save the input text as an annotation associated with the relevant cell. The annotation is assigned a reference sign 154 which references the annotation text 152 from among multiple annotation texts entered by the user. As illustrated in FIG. 5f, the reference sign 154 is displayed as a tertiary element 122c in cells (in the example it is a second cell class in non-selected state, but tertiary element display is the same in both cell classes and both the first and second display states) to which the annotation text 152 has been associated or linked by the user. The selected cell is the cell in which the secondary element 121b is displayed. The secondary element 121b is active, for example by cursor hover at an appropriate location or by tabbing or directional keyboard keys. Selection of the secondary element causes display of overlay menu 130. Overlay menu 130 comprises a first overlay menu option 131 which is to link to an existing annotation, for which purpose a summary 131a of saved annotations is included in the overlay menu. In the case illustrated, only a single annotation has been saved and so there is only a single selectable annotation. As illustrated by FIG. 5h, selection of annotation 1 from the overlay menu 130 causes a tertiary element such as tertiary element 122c to be displayed within the cell (in both selected and non-selected states). The terms note and annotation are used interchangeably. Second overlay menu option 132 is to add a new note, which, at the bottom of the frame, brings up a blank free text entry dialog box 150. Noting that the reference sign 154 may be pre-assigned to avoid clashes.

Once an annotation has been entered, the selectable box 151 is selected, and the free text entry dialog box 150 changes to a new display state, as illustrated by FIG. 5g. According to FIG. 5g, the title 153 and annotation text 152 are saved and are referenceable by the reference sign 154. The free text entry dialog box in the new display state includes an edit selectable element 155 and a further options menu selectable element 156.

Figures 5I, 5J:
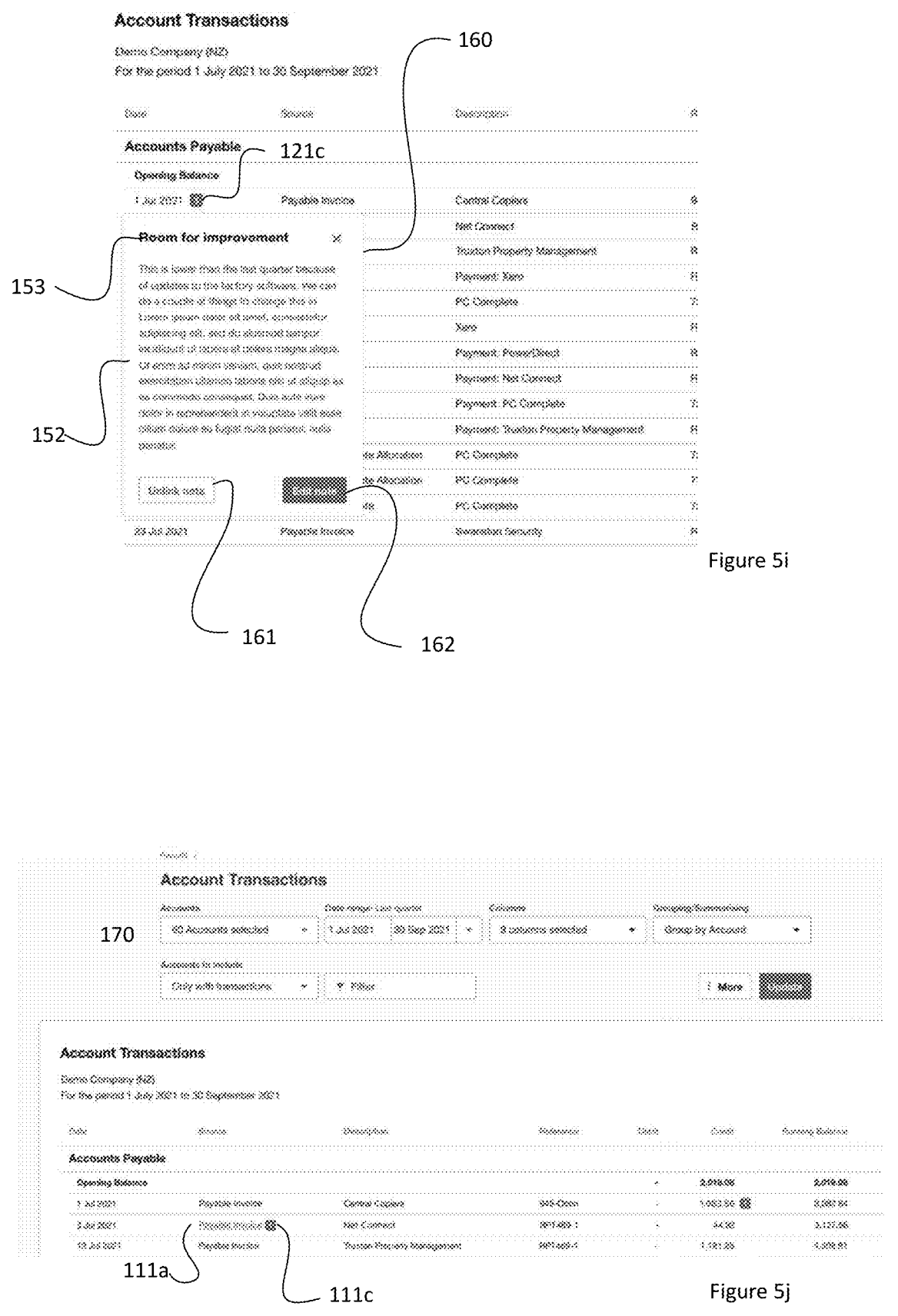

FIG. 5i illustrates that selection of the tertiary element 121c by cursor hover, or by other methods such as directional keys or tabbing, causes an annotation viewing overlay window 160 to be displayed in the frame of the graphical user interface. The annotation viewing overlay window 160 is overlaid on top of the tabular report data and includes the annotation title 153, the annotation text 152, and an unlink selectable element 161, which would have the effect of unlinking the cell with the annotation and thus removing the tertiary element 121c from the display states of the cell. An edit note selectable element 162 allows a user to modify the title 153 or text 152 of the annotation.

If an annotation is unlinked via unlink selectable element 161, or via other means, it is not deleted. That is, the annotation is still stored and may appear at the bottom of the report as a numbered textblock (along with the other stored annotations) and is available to be linked to cells.

FIG. 5j illustrates the effect of linking the annotation to different cells, and shows an optional third display state for cells belong to the first class, in which the selection of the cell does not cause the display of the secondary element, wherein the third display state replaces the second display state in instances where an annotation has been linked to the cell and thus the tertiary element 111c is present. The cell is the selected cell as illustrated by the highlighting of the primary element 111a. A tabular data subset selection menu 170 enables a user to filter the tabular data 24 to be displayed in the graphical user interface 14.

Figures 5K, 5L:
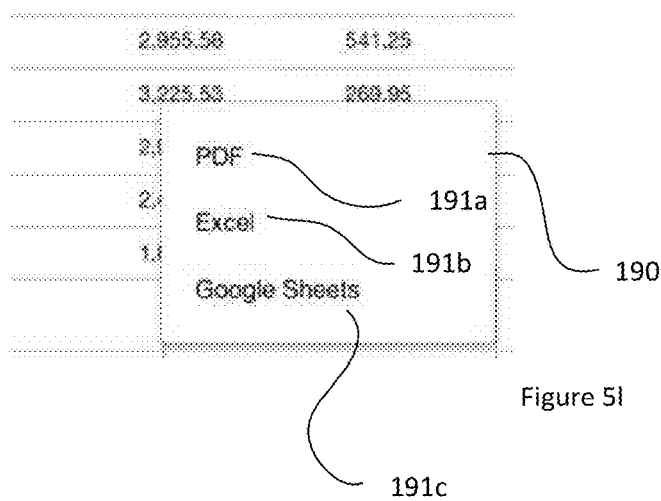

The graphical user interface, at the base of the report viewing frame, includes one or more selectable elements, as illustrated in FIG. 5k. Exemplary selectable elements include navigational elements 181 for switching between pages of a multi-page subset of tabular data, a save as element 182 for committing to storage the present subset of tabular data, and an export element 183 for exporting the subset of tabular data to another file format.

FIG. 5l illustrates an export overlay menu 190 displayed as a result of user selection of export element 183. Export overlay menu 190 comprises selectable export elements 191a, 191b, 191c, for exporting the subset of tabular data to different file formats.

Figure 6:
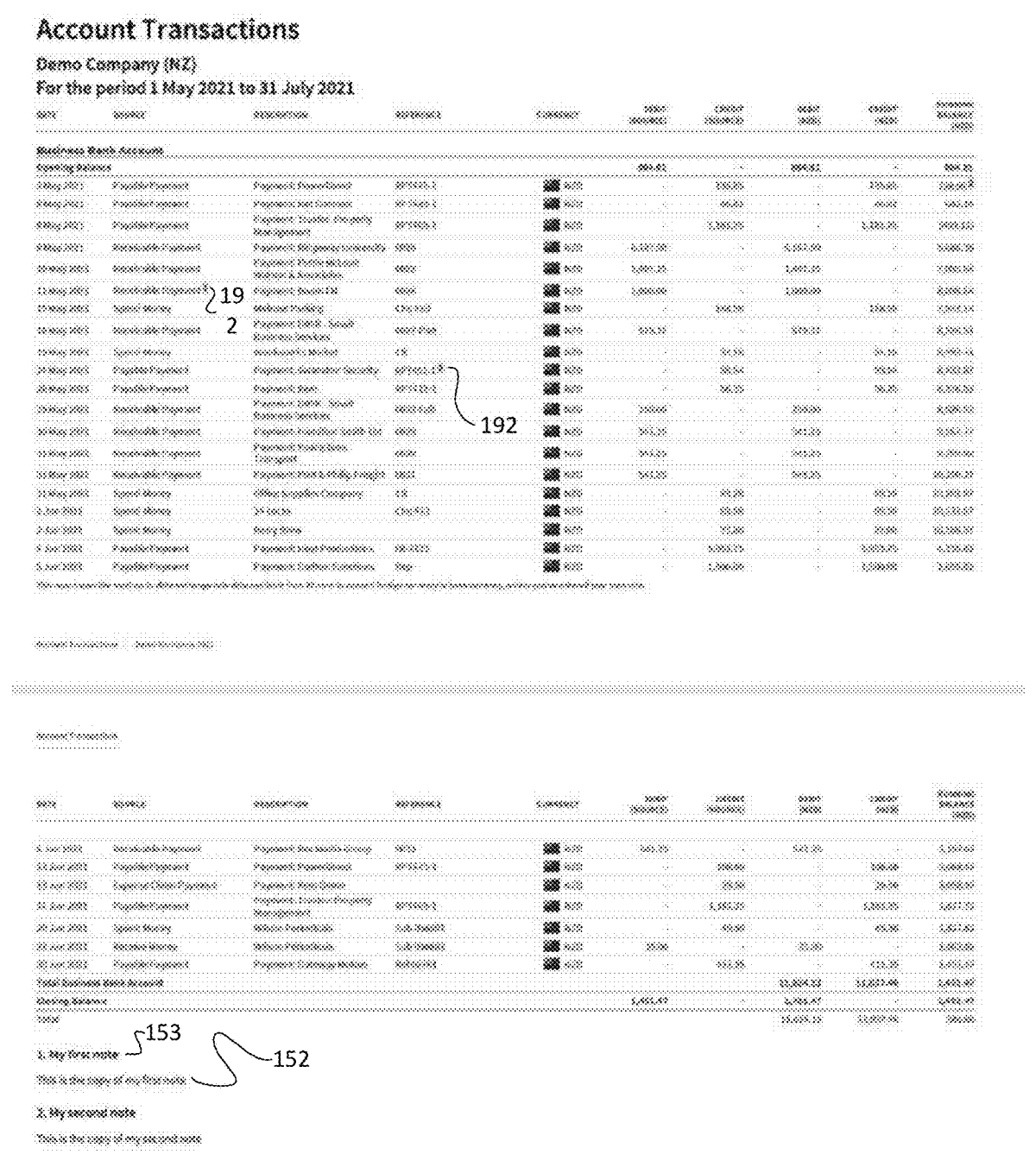

FIG. 6 illustrates a pdf resulting from selection of export element 191a, and in particular shows tertiary elements 192 in annotated cells. At the base of the exported tabular data the pdf includes the titles 153 and annotation text 152 for two annotations.

Figure 7:
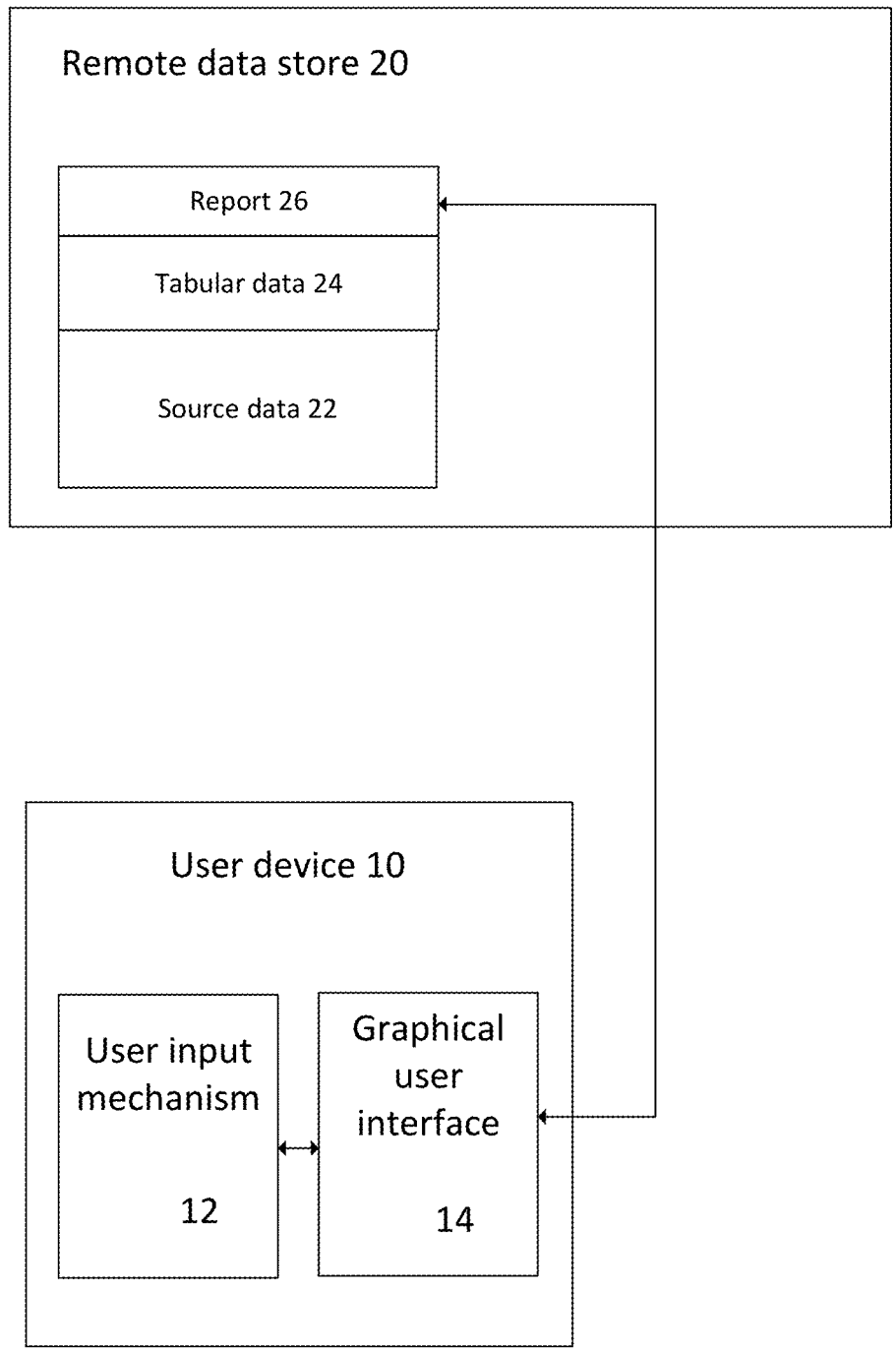
FIG. 7 illustrates a hardware arrangement of an embodiment.

FIGS. 3a to 5l illustrate a graphical user interface or portions thereof, for example, frames, portions of frames, or cells. FIG. 7 illustrates an example of a hardware architecture to which the graphical user interface 14 belongs. The graphical user interface 14 resides on a user device 10 and may be an artefact of a web portal or web application enabling interaction between a user via a user device 10, such as personal computing device or a smartphone, and a report 26 including tabular data 24 stored remotely such as at a remote data store 20 such as a data centre or server. The graphical user interface 14 may be accessible to a user as part of a subscription service to which the user subscribes (directly or via an associated legal or business entity). Thus, the graphical user interface 14 for interacting with tabular data 24 may be one aspect of a broader subscription service. Examples include accounting systems, whereby source data 22 such as financial data including banking data from one or more accounts belonging to the user, or to a legal or business entity on behalf of which the user is operating, is obtained automatically by the subscription service (using credentials submitted by the user via a bank feed or another mechanism), processed into data points, and which data points are stored on the remote data store 20 in the form of tabular data 24, which is included in a report 26. The report 26 includes tabular data and may include additional information such as title, relevant date range, and buttons and other elements facilitating navigation around the report by the user. For example, tabular data points 24 representing the same entity or the same aspect of a particular entity may be grouped together in a row or column, with an appropriate description at a header row or column.

The graphical user interface 14 may be part of a web application or another software entity installed on the user device 10. The user input mechanism 12 may be one or more from among a touchscreen, a mouse, a trackpad, and a keyboard. The user input mechanism 12 provides inputs such as directional inputs, tabbing inputs, cursor movements, and trigger inputs, which the operating system of the user device 10 receives and communicates to the graphical user interface 14, thereby enabling user interaction with the graphical user interface 14 and in turn with the report 26 and thus the tabular data 24.

Figure 8:
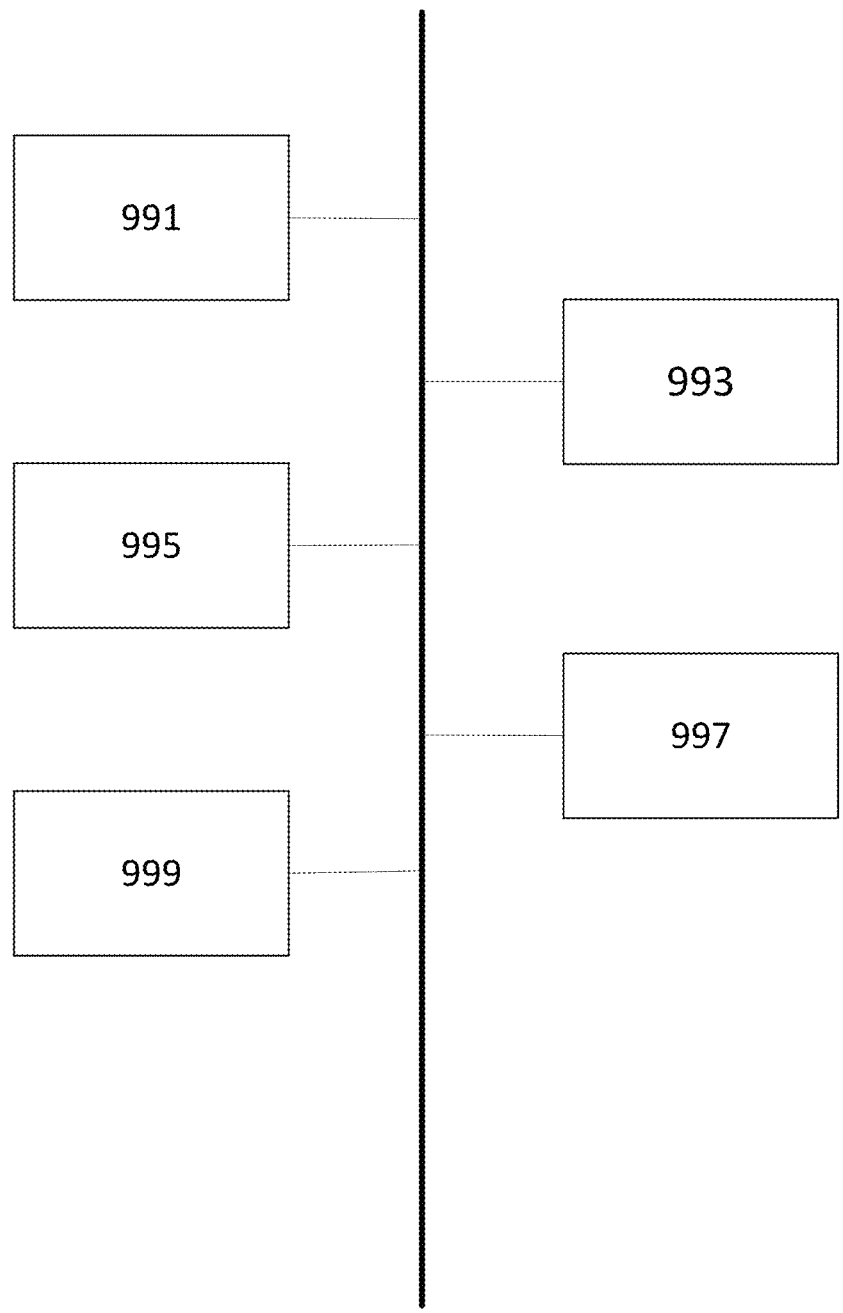
FIG. 8 illustrates a computing apparatus of an embodiment.

FIG. 8 is a schematic illustration of a hardware arrangement of a computing apparatus. The user device and/or the server such as the web server may be implemented by apparatus having an arrangement such as illustrated in FIG. 8.

The computing apparatus comprises a plurality of components interconnected by a bus connection. The bus connection is an exemplary form of data and/or power connection. Direct connections between components for transfer of power and/or data may be provided in addition or as alternative to the bus connection.

The computing apparatus comprises memory hardware 991 and processing hardware 993, which components are essential regardless of implementation. Further components are context-dependent, including a network interface 995, input devices 997, and a display unit 999. The display unit 999 and the processing hardware 993 may cooperate to implement a graphical user interface.

The memory hardware 991 may by computer-implemented, having a processor that stores processing instructions in a non-transitory computer-readable medium for execution by the processing hardware 993. The memory hardware 991 may include volatile and/or non-volatile memory. The memory hardware 991 may store data pending processing by the processing hardware 993 and may store data resulting from processing by the processing hardware 993.

The processing hardware 993 comprises one or a plurality of interconnected and cooperative CPUs for processing data according to processing instructions stored by the memory hardware 991.

Implementations may comprise one computing device according to the hardware arrangement of FIG. 8, or a plurality of such devices operating in cooperation with one another. For example, in a client:server arrangement.

A network interface 995 provides an interface for transmitting and receiving data over a network. Connectivity to one or more networks is provided. For example, a local area network and/or the internet. Connectivity may be wired and/or wireless.

Input devices 997 provide a mechanism to receive inputs from a user. For example, such devices may include one or more from among a mouse, a touchpad, a keyboard, an eye-gaze system, and a touch interface of a touchscreen. Inputs may be received over a network connection. For example, in the case of server computers, a user may connect to the server over a connection to another computing apparatus and provide inputs to the server using the input devices of the another computing apparatus.

A display unit 999 provides a mechanism to display data visually to a user. The display unit 999 may display user interfaces by which certain locations of the display unit become functional as buttons or other means allowing for interaction with data via an input mechanism such as a mouse. A server may connect to a display unit 999 over a network.

A GUI for displaying tabular data, each row being divided into cells; the GUI including a frame within which cells are displayed; in a first display state a selected cell comprises a selectable element within the cell, the selectable element being highlighted according to input from a user input mechanism, the GUI executes an action in response to a trigger input from the user input mechanism while highlighted; and in a second display state, the selectable element is not visible.

REFERENCE NUMERALS

Reference numerals 11X indicate cells instantiating the first cell class, wherein 111 indicates a selected cell and 112 a non-selected cell. Reference numerals 12X indicate cells instantiating the second cell class, wherein 121 indicates a selected cell and 122 a non-selected cell. For illustrative purposes, not all cells and cell elements are marked in all cells. Suffix a indicates primary element, b secondary element, and c tertiary element.

The invention claimed is:

1. A computing apparatus comprising a processor, a memory, and a display unit, the memory including a non-transitory computer-readable medium storing processing instructions which, when executed by the processor, cause the processor and display unit to implement a graphical user interface for displaying an interactive report including one or more rows of tabular data, each row of tabular data being divided into one or more cells each corresponding to a column;

the graphical user interface including an interactive report viewing frame within which a plurality of the cells are displayed at a time, wherein a single cell at a time from among the displayed cells is a selected cell, the single cell being selectable by input from a user input mechanism;

each displayed cell being displayed in a first display state when the cell is the selected cell, and a second display state when the cell is not the selected cell, wherein in the first display state, the cell comprises a primary element at a first location within the cell, and a secondary element at a second location within the cell, the primary element being a data point of the tabular data, and the secondary element being selectively highlighted according to input from the user input mechanism, the graphical user interface being configured to execute a secondary element action in response to a trigger input from the user input mechanism while the secondary element is highlighted; and in the second display state, the cell comprises the primary element at the first location within the cell, and the secondary element is not visible within the cell, wherein the secondary element action is to display in the graphical user interface an overlay menu including an option to associate a selected annotation with the selected cell, the selected annotation being selected from the overlay menu, the overlay menu comprising one or more previously input annotations as individually selectable menu items, the selected annotation being represented in the selected cell by a tertiary element, the tertiary element being an annotation symbol mapping to the selected annotation.

2. The computing apparatus according to claim 1, wherein in all or a subset of the cells:

the primary element and the secondary element are individually selectively highlightable on a mutually exclusive basis according to input from the user input mechanism, the graphical user interface being configured to cause execution of a primary element action in response to a trigger input from a user input mechanism while the primary element is highlighted, and to cause execution of the secondary element action in response to a trigger input from the user input mechanism while the secondary element is highlighted.

3. The computing apparatus according to claim 2, wherein the tabular data is alphanumeric data and in each cell the primary element is a data point of the tabular data, and is a hyperlink to a respective destination within the interactive report, the primary element action being to navigate the interactive report viewing frame to the destination of the hyperlink of the highlighted primary element.

4. The computing apparatus according to claim 3, wherein the report is hierarchical and comprises data at a plurality of levels from a lowest level up to a highest level, wherein tabular data from one level from among the plurality of levels is displayed at a time within the interactive report viewing frame, and wherein one or more of the plurality of levels comprises tabular data; and the primary element in each cell being a hyperlink to a lower level within the report containing data logically associated with the tabular data in the cell.

5. The computing apparatus according to claim 1, wherein the secondary element action is a default action, the secondary element being an icon, wherein a trigger input from the user input mechanism while the icon is highlighted causes execution of the secondary element action.

6. The computing apparatus according to claim 5, wherein a plurality of annotations are each mapped to by respective annotation symbols, the annotation symbol in the cell being represented by the tertiary element and being selectable according to a user input, and selection of the tertiary element causing display on an overlay within the report viewing frame, or display elsewhere within the graphical user interface, of the annotation.

7. The computing apparatus according to claim 5, wherein the tertiary element in a cell is individually selectively highlighted on a mutually exclusive basis with the primary element and/or the secondary element of a same cell while the cell is the selected cell, and selectable via a trigger input from a user input mechanism while highlighted, or via a cursor hover event at the location of the tertiary element.

8. The computing apparatus according to claim 1, wherein the secondary element action is a selectable action from an overlay menu, the secondary element being an icon, wherein highlighting of the icon, or a trigger input from the user input mechanism while the icon is highlighted, causes display of the overlay menu within the report viewing frame, from which overlay menu the secondary element action is selectable from among a plurality of selectable secondary element actions, selection of the secondary element action from the overlay menu causing execution of the secondary element action.

9. The computing apparatus according to claim 8, wherein the plurality of selectable secondary element actions in the overlay menu are cell manipulation actions, each cell manipulation action causing a modification to a form and/or a content of the respective cell in the first and second display states.

10. The computing apparatus according to claim 1, wherein within the report viewing frame an instantaneously visible region of the tabular data is displayed at a time, a size and/or location within the tabular data of the instantaneously visible region being dynamic according to user scroll and/or zoom inputs.

11. A server computer comprising a memory and a network interface, the server computer being configured to serve to a client computing apparatus over the network interface, a graphical user interface for displaying an interactive report including one or more rows of tabular data, each row of tabular data being divided into one or more cells each corresponding to a column;

the graphical user interface including an interactive report viewing frame within which a plurality of the cells are displayed at a time, wherein a single cell at a time from among the displayed cells is a selected cell, the single cell being selectable by input from a user input mechanism;

each displayed cell being displayed in a first display state when the cell is the selected cell, and a second display state when the cell is not the selected cell, wherein in the first display state, the cell comprises a primary element at a first location within the cell, and a secondary element at a second location within the cell, the primary element being a data point of the tabular data, and the secondary element being selectively highlighted according to input from the user input mechanism, the graphical user interface being configured to execute a secondary element action in response to a trigger input from the user input mechanism while the secondary element is highlighted; and in the second display state, the cell comprises the primary element at the first location within the cell, and the secondary element is not visible within the cell, wherein the secondary element action is to display in the graphical user interface an overlay menu including an option to associate a selected annotation with the selected cell, the selected annotation being selected from the overlay menu, the overlay menu comprising one or more previously input annotations as individually selectable menu items, the selected annotation being represented in the selected cell by a tertiary element being an annotation symbol mapping to the selected annotation.

12. A computer-implemented method comprising:
at a graphical user interface, displaying an interactive report including one or more rows of tabular data, each row of tabular data being divided into one or more cells each corresponding to a column;
at the graphical user interface, displaying an interactive report viewing frame within which a plurality of the cells are displayed at a time, wherein a single cell at a time from among the displayed cells is a selected cell, the single cell being selectable by input from a user input mechanism;
each displayed cell being displayed in a first display state when the cell is the selected cell, and a second display state when the cell is not the selected cell, wherein
in the first display state, the cell comprises a primary element at a first location within the cell, and a secondary element at a second location within the cell, the primary element being a data point of the tabular data, and the secondary element being selectively highlighted according to input from the user input mechanism, the computer-implemented method further comprising executing a secondary element action in response to a trigger input from the user input mechanism while the secondary element is highlighted; and
in the second display state, the cell comprises the primary element at the first location within the cell, and the secondary element is not visible within the cell,
wherein the secondary element action is to display in the graphical user interface an overlay menu including an option to associate a selected annotation with the selected cell, the selected annotation being selected from the overlay menu, the overlay menu comprising one or more previously input annotations as individually selectable menu items, the selected annotation being represented in the selected cell by a tertiary element being an annotation symbol mapping to the selected annotation.

13. A non-transitory computer-readable medium storing processing instructions which, when executed by a computing device comprising processor hardware and memory hardware, causes the processor hardware to execute the computer-implemented method of claim 12.

* * * * *